Dec. 19, 1967 F. P. CORR ET AL 3,359,543

DATA TRANSMISSION SYSTEM

Filed July 2, 1965 14 Sheets-Sheet 1

INVENTORS
FRANCIS P. CORR
ALEXANDER H. FREY JR.

BY Homer L. Kneal
AGENT

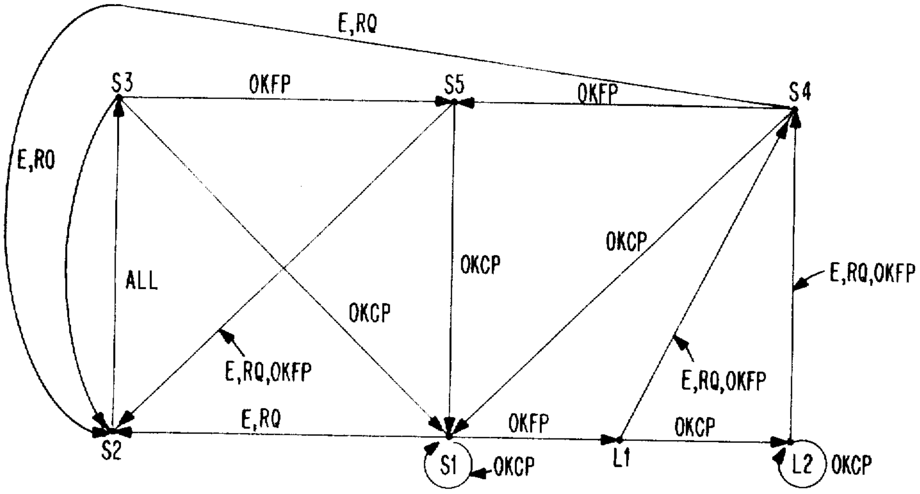

FIG. 5

| STATE | OK-RQ GENERATOR | DECODER BUFFER | EXPECTED POLARITY SEQUENCE | READ-OUT INHIBIT COUNTER | DECODER TREAT NEXT MESSAGE AS |
|---|---|---|---|---|---|
| L1 | SENDS AN OK TO THE ENCODER | TRIES TO READ ONE SHORT MESSAGE | UNCHANGED | NOT SET | LONG |
| L2 | SENDS AN OK TO THE ENCODER | TRIES TO READ ONE LONG MESSAGE | UNCHANGED | NOT SET | LONG |
| S1 | SENDS AN OK TO THE ENCODER | TRIES TO READ ONE SHORT MESSAGE | UNCHANGED | NOT SET | SHORT |
| S2 | SENDS AN RQ TO THE ENCODER | DOES NOT READ-OUT | UNCHANGED | NOT SET | SHORT |
| S3 | SENDS AN OK TO THE ENCODER | DOES NOT READ-OUT | UNCHANGED | NOT SET | SHORT |
| S4 | SENDS AN RQ TO THE ENCODER | DOES NOT READ-OUT | INVERTED | NOT SET | SHORT |
| S5 | SENDS AN OK TO THE ENCODER | TRIES TO READ ONE SHORT MESSAGE | INVERTED | SET TO THE LONG INFORMATION COUNT | SHORT |

RECEIVER RULES FOR ADAPTIVE DUAL-RQ

FIG. 6 tD MAX FOR GO BACK 2 = t'D = $\frac{n}{2}$ - (r+2)

EXAMPLE 2 SWITCH FROM LONG BLOCKS TO SHORT BLOCKS WITH A SINGLE ERROR

EXAMPLE 3 SWITCH FROM LONG BLOCKS TO SHORT BLOCKS WITH TWO ERRORS

Dec. 19, 1967 F. P. CORR ET AL 3,359,543

DATA TRANSMISSION SYSTEM

Filed July 2, 1965 14 Sheets-Sheet 13

EXAMPLE 4 ERROR IN SHORT BLOCK IMMEDIATELY PRECEDING FIRST LONG BLOCK AT WEST TERMINAL

Dec. 19, 1967 F. P. CORR ET AL 3,359,543

DATA TRANSMISSION SYSTEM

Filed July 2, 1965 14 Sheets-Sheet 14

EXAMPLE 5 ERROR IN SHORT BLOCK IMMEDIATELY PRECEDING FIRST LONG BLOCK AT EAST TERMINAL

United States Patent Office 3,359,543

Patented Dec. 19, 1967

3,359,543

DATA TRANSMISSION SYSTEM

Francis P. Corr, Rockville, and Alexander H. Frey, Jr., Gaithersburg, Md., assignors to International Business Machines Corporation, Armonk, N.Y., a corporation of New York Filed July 2, 1965, Ser. No. 469,125
12 Claims. (Cl. 340—172.5)

The invention described was made in the course of or under a contract with the Department of the Air Force.

This invention relates to an adaptive, dual request-retransmit, data transmission system. More particularly, the invention relates to apparatus for adapting the mode of operation of a dual request-retransmit data transmission system to transmit different message formats in response to the error-free quality of the transmission link.

A conventional dual request-retransmit transmission (Dual RQ) system consists of two transmitting-receiving terminals which are simultaneously transmitting data to each other. The messages sent by these terminals are divided into message blocks. The message block contains, in addition to data, a confirmation/request-retransmit (OK/RQ) signal. The system is dual in that message blocks are traveling in both directions, and accordingly confirmation and request-retransmit signals are likewise traveling in both directions with the message blocks.

A dual RQ system is discussed in detail in an article entitled, "The Design of an Error-Free Data Transmission System for Telephone Circuits," by Reiffen, Schmidt and Yudkin in the AIEE, page 224, July 1961. The Dual RQ system taught in the article operates to retransmit two message blocks in the event that an RQ signal is received from the other terminal in the transmission link. As an example, assume two message blocks A and B are transmitted consecutively from a first terminal to a second terminal. Meanwhile, the second terminal is transmitting its own message blocks X and Y to the first terminal. The first terminal is looking at each received message block X and Y for data and also for OK or RQ signals indicating whether the second terminal correctly received the first terminal's message blocks A and B. Block X from the second terminal would be received by the first terminal, while the first terminal is transmitting message block B. This message block X contains an OK or an RQ signal for the first terminal's previously transmitted message block A. If message block X contained an RQ signal indicating that message block A was not properly received at the second terminal, then the first terminal retransmits message blocks A and B. This procedure holds equally well for the second terminal with respect to its message blocks X and Y, i.e., message block B would contain an OK or an RQ signal indicating whether the first terminal received message block X properly.

The above Dual RQ system is quite effective in achieving error-free data transmission. However, the system has a fault in that, if the transmission link begins to deteriorate in quality so that messages are often improperly received, the terminals in the system will constantly be retransmitting message blocks and the operation becomes very inefficient. Deterioration in the transmission link can be compensated for by changing the message block format being transmitted. For example, different lengths of messages could be used or more check bits could be used or the duration of a data bit could be changed. By any of these adaptations, it would be possible to transmit a message block in a new form which would be more resistant to adverse conditions on the transmission link. The price for using a message format resistant to adverse conditions is a reduction in the rate of data transmission.

The conventional Dual RQ system uses one message block format which has a normal resistance to interference on the transmission link. Therefore, when the interference is low, the conventional Dual RQ system is inefficient because it does not transmit data at a rate as high as it could. Likewise when the interference is high the conventional Dual RQ system continuously retransmits data. It is therefore very desirable to have an Adaptive Dual RQ system whereby one message format could be used efficiently at times of low interference and a second message format used efficiently at times of high interference. An adaptive Dual RQ system would adapt its mode of operation to change the format of transmitted messages according to interference or other adverse conditions on the transmission link.

An adaptive Dual RQ system is difficult to implement because of first, the problem of synchronizing the mode of operation (the message format) of two terminals in the transmission link and second, the problem of determining how much data must be retransmitted in the event a request-retransmit (RQ) signal is received from the other terminal. If one terminal makes a change in message format, for example, from long block messages to short block messages, it must also tell the other terminal it has made such a change. Otherwise, the other terminal will be looking for the wrong size message block and will not properly receive the message block. Thus, there is a mode synchronizing problem between two terminals in the transmission link. Similarly, there is a request-retransmit problem as to how much data a terminal must retransmit when it receives an RQ signal from the other terminal or detects an error. (The terminal assumes that an erroneous, received message block contains an RQ signal.) For example, if there are two modes of operation, one with long blocks and the other with short blocks, the amount of data in a long block will be significantly greater than the amount of data in a short block. Therefore, the amount of data that must be retransmitted will depend upon what mode the terminal has been transmitting in when it receives the RQ signal.

It is therefore an object of this invention to adapt the message format of a dual request-retransmit data transmission system to the condition of the transmission link.

It is a further object of this invention to synchronize the mode of operation of two terminals in an adaptive, dual request-retransmit data transmission system.

It is another object of this invention to determine how much data must be retransmitted from a terminal in an adaptive dual request-retransmit data transmission system when the other terminal makes a request for retransmission of data.

In accordance with this invention, the above objects are accomplished by an adaptive dual request-retransmit data transmission (Adaptive Dual RQ) system. The system consists of two terminals each of which is adaptive into two modes of operation with regard to the structure of the message block it transmits and receives. In a first mode, the message block carries a large amount of data and is very susceptible to adverse conditions in the transmission link. In the second mode, the message black carries a small amount of data and is very resistant to adverse conditions in the transmission link. In both modes, the message block contains a confirmation/request-retransmit (OK/RQ) signal and a mode synchronizing signal. Each terminal monitors received message blocks from the other terminal for the OK/RQ and mode synchronizing signals and in addition for a signal indicating when the message block is received in error. In response to these three signals, error, OK/RQ, and mode synchronzing, the terminal synchronizes its mode of operation with the other terminal and determines how much data to retransmit when an error is detected or an RQ is received. If a message block is received in error, the terminal receiving it assumes that the other terminal has inserted an RQ signal in it. The mode of operation of each terminal is determined by the OK/RQ signal and the mode synchronizing signal generated at the other terminal. Thus, each terminal is controlling the mode of operation of the other terminal, whereby they maintain a cooperative relationship both as to mode of operation and also retransmission of data when necessary.

To solve the mode synchronizing problem, each terminal changes its mode of operation in response to the quality of the transmission link and signals the change to the other terminal. If the conditions on the transmission link are favorable, each terminal changes to the first mode. The terminal signals the change to the other terminal by means of the mode synchronizing signal in the transmitted message block. If the conditions on the transmission link are adverse, each terminal changes to the second mode. The terminal signals the change to the other terminal by inserting an RQ signal in the transmitted message block. Thus, each terminal changes its mode of operation according to the condition of the transmission link and inserts a signal in its transmitted message block to indicate its change in mode to the other terminal.

To solve the data retransmission problem—how much data must be retransmitted—each terminal controls its retransmission in accordance with the terminal's mode of operation when the request-retransmit (RQ) signal is received or an error is detected. Retransmission is required when the received message block is in error because the erroneous message block might contain an RQ signal. If the RQ signal arrives while the terminal is in the first mode, the terminal will retransmit the data previously transmitted in the first mode message blocks to which the RQ signal relates. A similar function takes place for second mode message blocks when an RQ signal is received while the terminal is in the second mode of operation. If the RQ signal is received during a transition from second mode to first mode of operation, the terminal will retransmit the data from both the first mode and second mode message blocks to which the RQ signal relates. Thus, each terminal retransmits an amount of data according to its mode of operation at the time an RQ signal is received.

In another aspect of the invention a read-out inhibit gate in each terminal in response to the mode synchronizing signal received from the other terminal will block a second read-out of the same data received a second time. Data might be received a second time because the OK signal, sent to the other terminal to confirm the first receipt, is not properly received by the other terminal. This additional aspect of the invention insures single read-out of correct messages.

Our invention, Adaptive Dual RQ, makes error-free data transmission links more efficient. Under favorable conditions the data transmission link will be fully exploited by error-free transmission of large amounts of data. Under adverse conditions the system adapts to transmit in a low data rate mode less susceptible to interference. Data transmission does not entirely break down unless conditions become so adverse that even in the low data rate mode, error-free data will not pass. This adaptivity means that in the long run more data is transmitted because the transmission link will be more efficiently used whether it is operating under favorable conditions or adverse conditions.

As an additional bonus, the Adaptive Dual RQ system requires a smaller buffer in the data source than would be required by a conventional Dual RQ system because under adverse conditions the former is more apt to transmit data than the latter.

The foregoing and other objects, features, and advantages of the invention will be apparent from the following more particular description of a preferred embodiment of the invention as illustrated in the accompanying drawings.

Figure 3A:
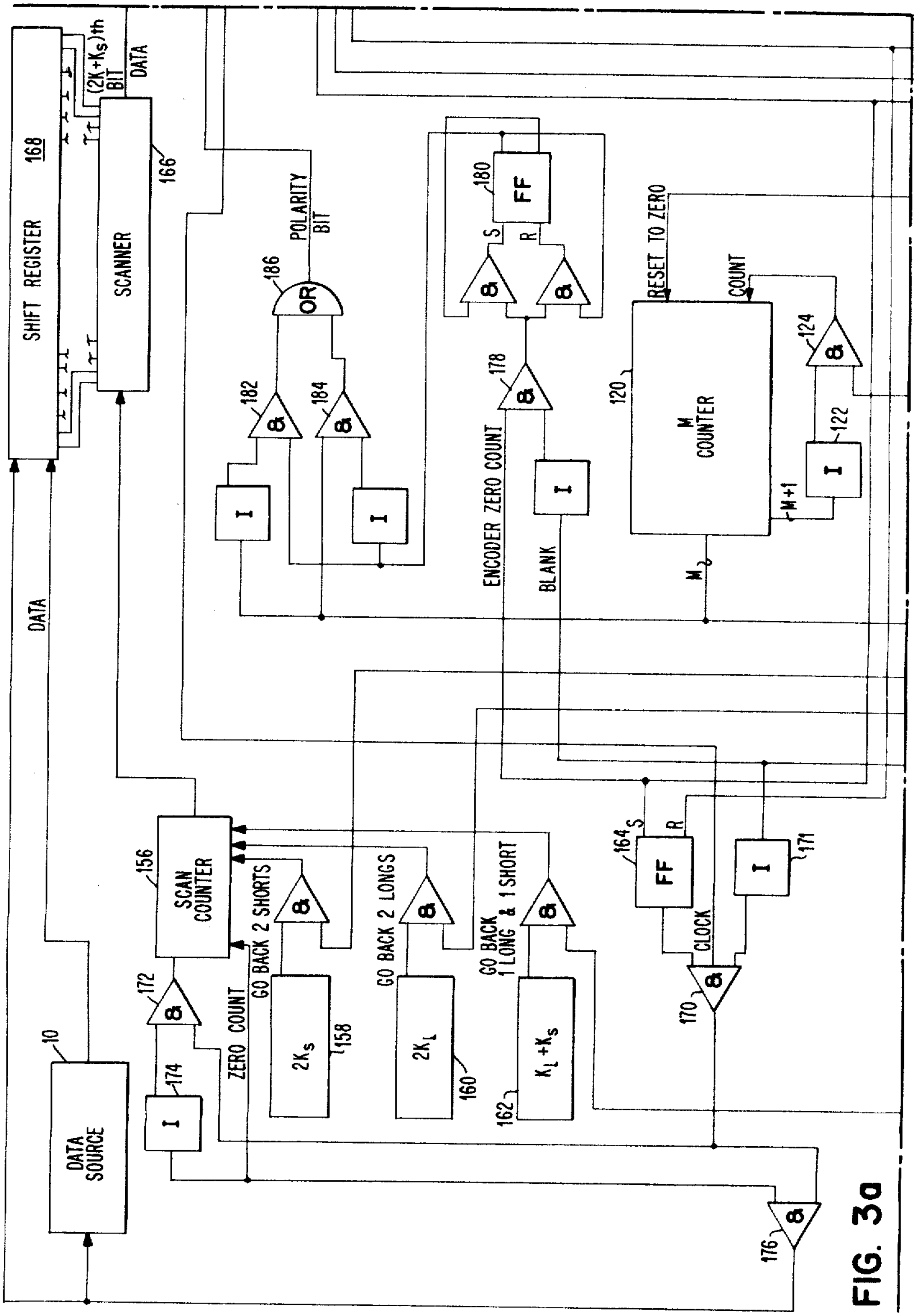
Figure 3B:
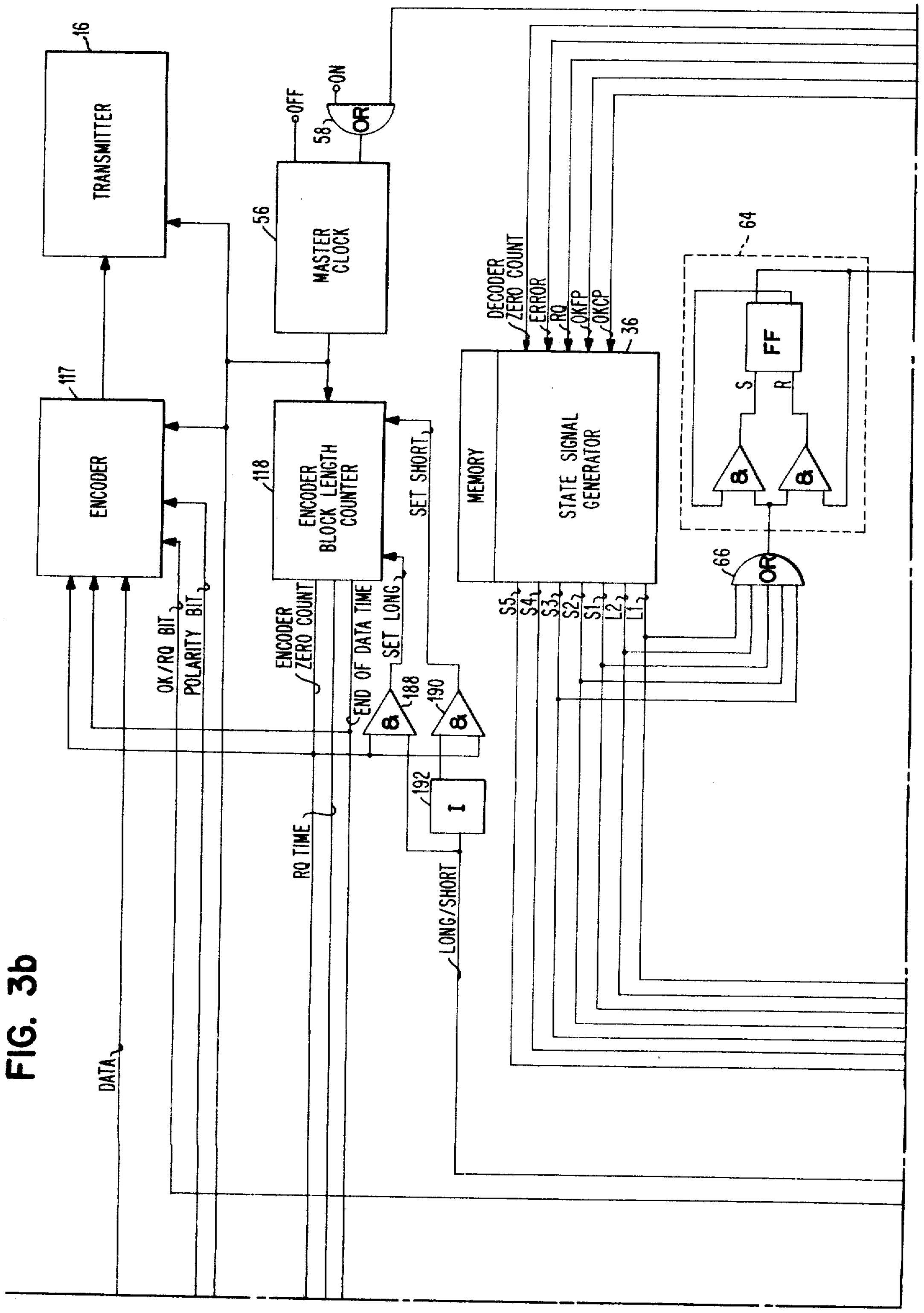
Figures 3, 3C:
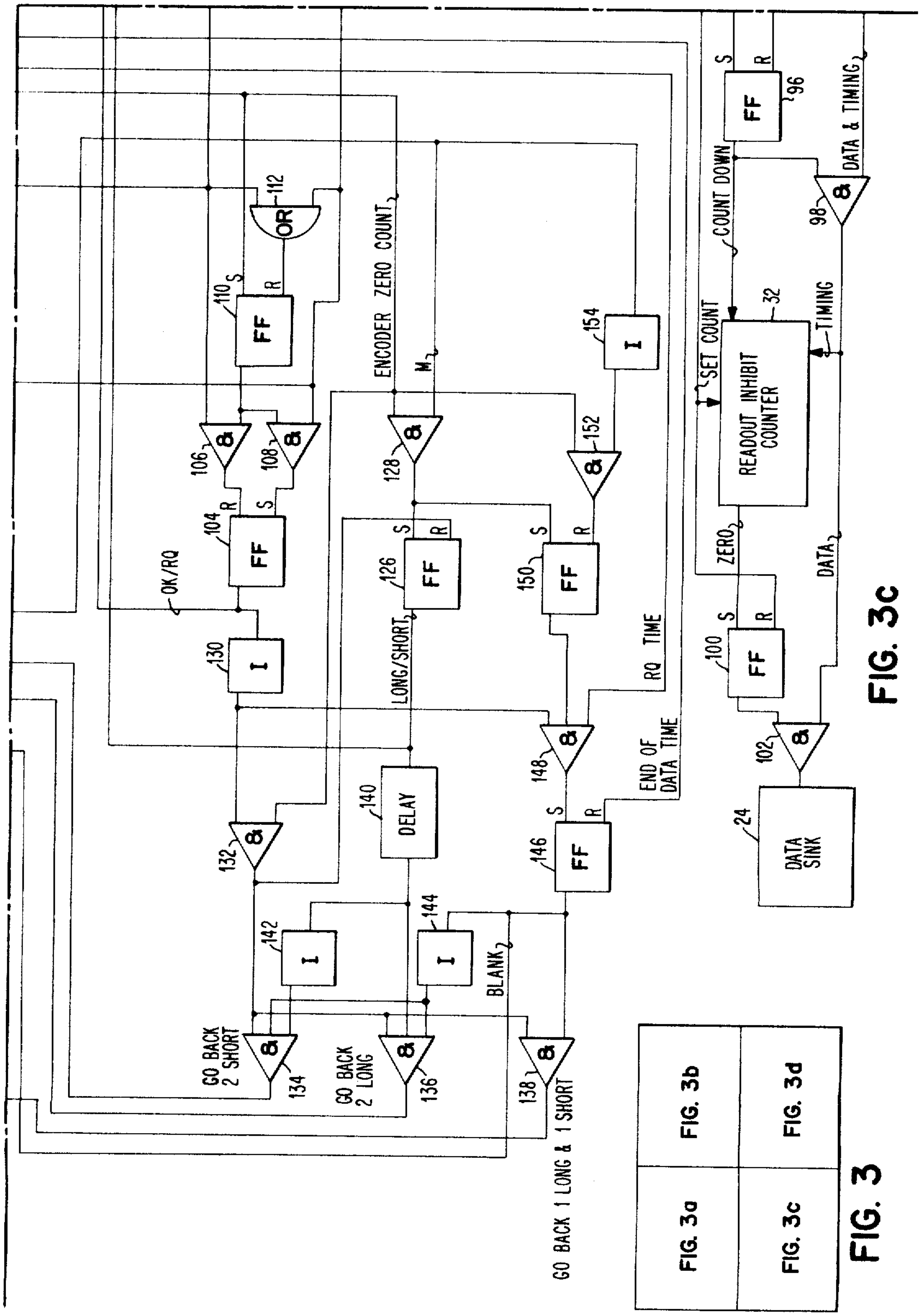
Figure 3D:
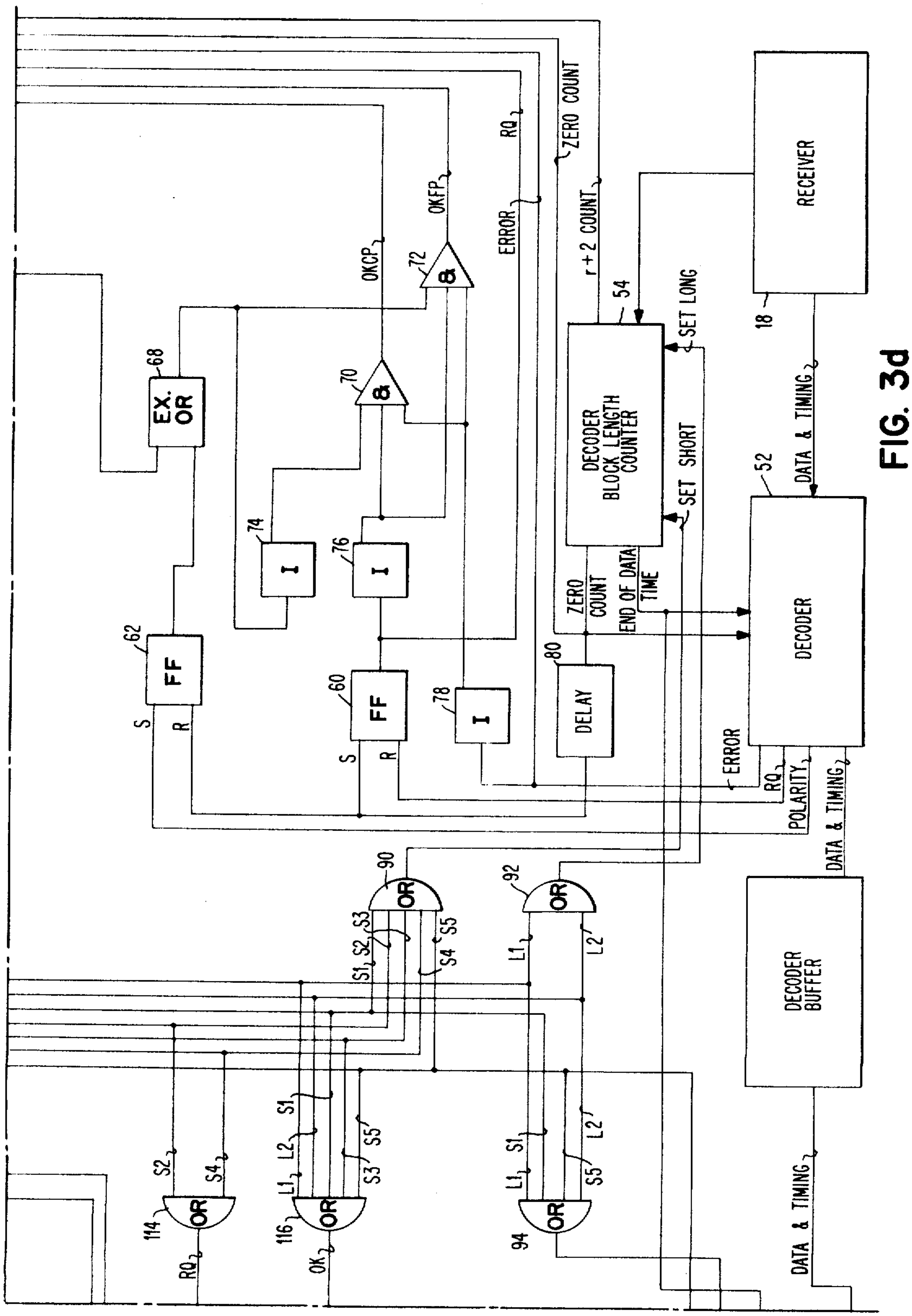

FIG. 3 consisting of four sheets of drawings identified as FIGS. 3*a*, 3*b*, 3*c*, and 3*d* shows a detailed logic block diagram for a terminal capable of use in an adaptive dual request-retransmit data transmission system.

Figure 4:
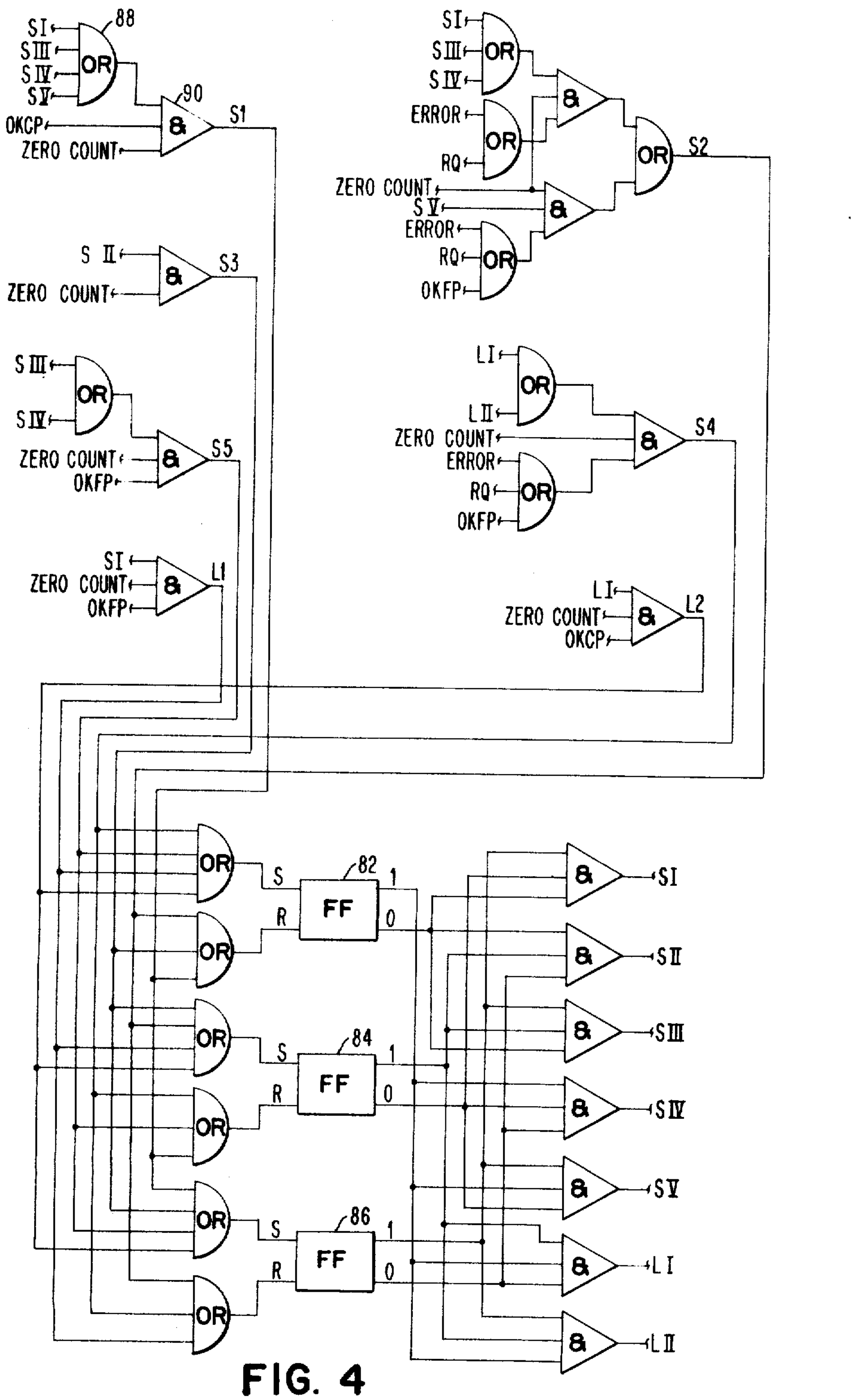

FIG. 4 shows the structure of the logic for the state signal generator shown in FIG. 3.

FIG. 5 shows a state diagram for the operation of a terminal in Adaptive Dual RQ.

FIG. 6 shows the rules of operation for a terminal in Adaptive Duel RQ according to the state signal generated.

Figure 7:
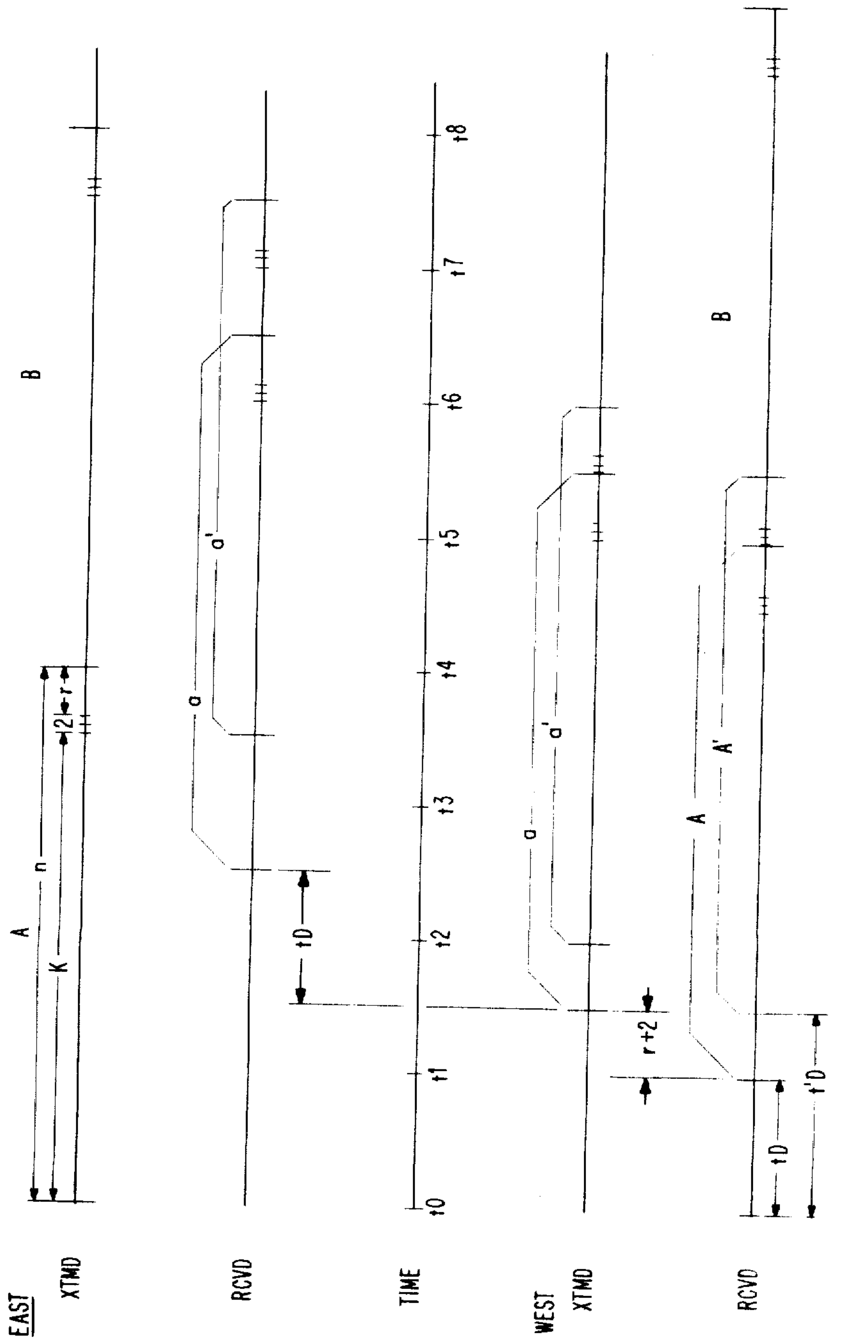

FIG. 7 shows the time relationship of messages transmitted between an east and west terminal in an adaptive, dual request-retransmit data transmission system.

FIGS. 8 to 12 show five examples of the operation of an adaptive dual request-retransmit data transmission system.

GENERAL DESCRIPTION

Figure 1:
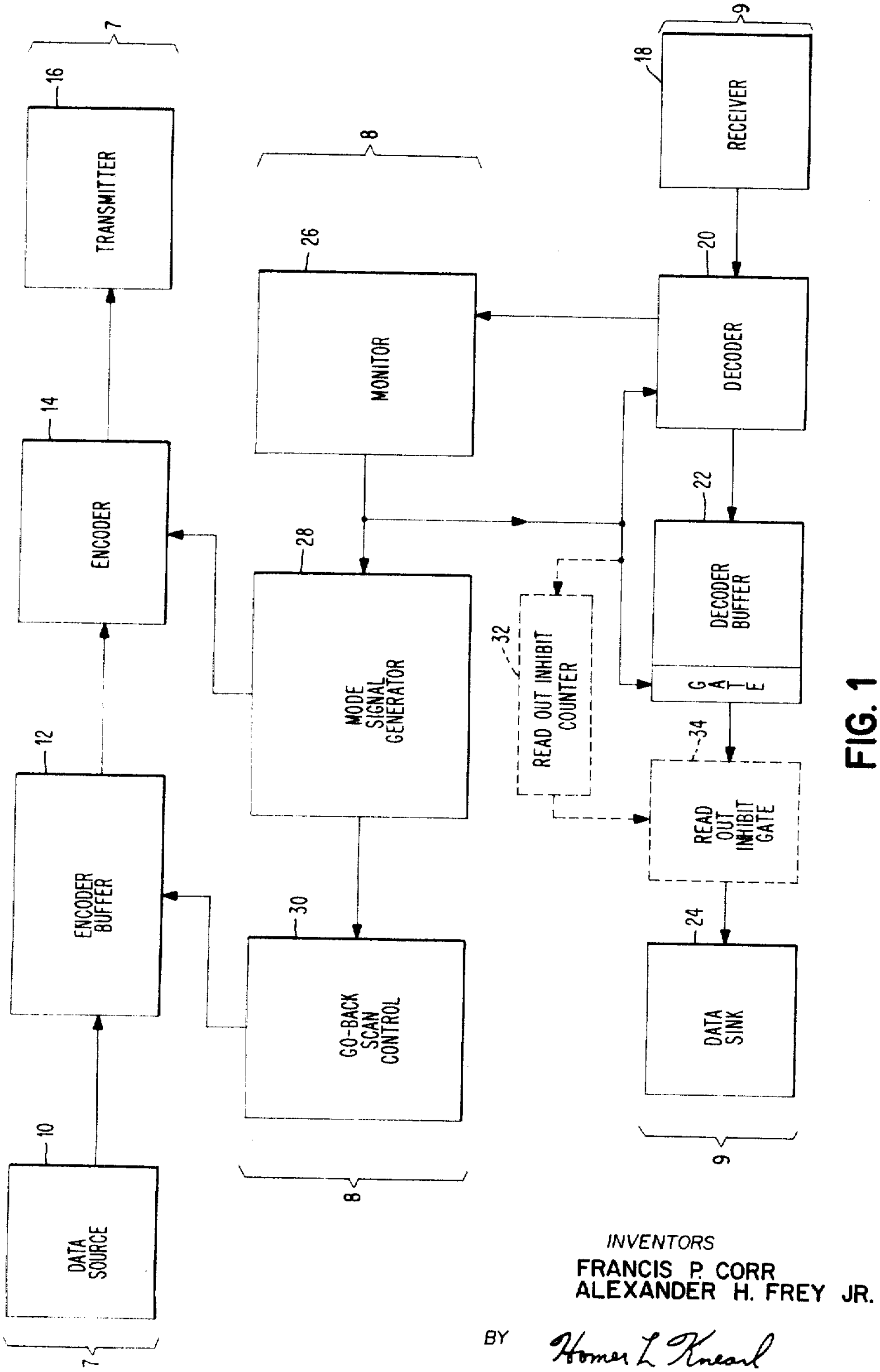
FIG. 1 shows a terminal capable of use in an adaptive dual request-retransmit data transmission system.

Referring to FIG. 1, a terminal for an adaptive dual request-retransmit data transmission system is shown; the system would require two such terminals. Each terminal can be divided into three portions, a transmitting portion 7, a receiving portion 8, and an adaptive control portion 9.

The transmitting portion 7 of the terminal comprises data source 10, encoder buffer 12, encoder 14, and transmitter 16. The data source 10 supplies data bits to the encoder buffer 12. The encoder buffer temporarily stores the transmitted data. The capacity of the encoder buffer is determined by how much data must be retransmitted in the event the terminal receives an RQ signal as hereinafter explained. From the encoder buffer, the data goes to encoder 14. Encoder 14 forms message blocks to be transmitted and passes them to transmitter 16 for transmission.

The receiving portion 8 of the terminal comprises receiver 18, decoder 20, decoder buffer 22 and data sink 24. Receiver 18 demodulates the message block from the received signal and passes the message block on to decoder 20. Decoder 20 decodes data from the massage block, generates an error signal when the message block is in error and also detects the OK/RQ signal and the mode synchronizing signal in the message block. From the decoder, data is passed to the decoder buffer 22. If the message block is error free, the data is gated out of the decoder buffer to data sink 24.

The adaptive control portion 9 of the terminal comprises monitor 26, mode signal generator 28 and go-back scan control 30. Monitor 26, in response to the error, OK/RQ and mode cynchronizing signals from decoder 20, generates state signals to control the mode of operation of the terminal. State signals are generated according to what state the terminal is operating in when the above signals are received from the decoder. A new state signal when generated is temporarily stored in a memory in the monitor and is also sent from the monitor to the decoder 20, decoder buffer 22 and mode signal generator 28.

Decoder 20 is responsive to the state signal to change its mode of operation to be consistent with the format of received message blocks. For example, if the message blocks are either long or short in length, the state signal tells decoder 20 when to decode in the long or short block format. Decoder buffer 22 is also responsive to the state signal to gate out received data when the state signal indicates the data is error-free, i.e., from a correctly received message block which is not ignored and which contains an OK signal.

Mode signal generator 28, in response to the state signal from monitor 26, performs two functions. The first function is to control the format of the message block to be transmitted by the terminal and also to generate an OK/RQ signal and a mode synchronizing signal for insertion into the message black to be transmitted. The second function of a mode signal generator is to convey to the go-back scan control the format of message block being transmitted at the time a retransmission becomes necessary.

With regard to the first function, the format of transmitted message blocks could be, for example, two modes, one being long block and the other short block. The long block mode would be used when the transmission link is operating under favorable conditions and the short block mode would be used when the transmission is operating under adverse conditions. The mode signal generator 28 is responsive to state signals which indicate adverse conditions because they contain errors or RQ's. In response to these state signals, the mode signal generator causes the encoder 14 to change to the short block mode of operation. On the other hand, if the state signals indicate that conditions on the transmission link are favorable, because of the receipt of error-free messages with OK signals, then the mode signal generator would cause the encoder to transmit long block messages. Thus, the state signals indicate the condition of the transmission link and accordingly, the mode signal generator in response to them adjusts the operation of the terminal. Changes in operation of the terminal are conveyed to the other terminal in the transmission link by means of the OK/RQ signal and the mode synchronizing signal which are inserted into transmitted message blocks.

With regard to the second function of a mode signal generator, the go-back scan control 30 is responsive to the mode signal generator 28 to convey to encoder buffer 12 how much data must be retransmitted. From the mode signal generator 28, the scan control 30 receives a message format signal to indicate what the present mode of operation of the terminal is and a signal to indicate when a retransmission is necessary. The go-back scan control 30 combines these two pieces of information to determine how much data must be retransmitted. Encoder buffer 12 is then responsive to go-back scan control 30 to read out previously transmitted data for retransmission.

In another aspect of the invention the adaptive control portion of the terminal also includes a read-out inhibit counter 32 and a read-out inhibit gate 34 shown in dotted lines in FIG. 1. The purpose of these devices is to block double read-out of the same data. Read-out inhibit counter 32 is responsive to state signals from the monitor 26 to control the read-out inhibit gate 34. When the state signal indicates that a message block has previously been correctly received, the read-out inhibit counter 32 is set. Counter 32 then counts down and while doing so inhibits by means of read-out inhibit gate 34 the passage of data from the decoder buffer 22 to the data sink 24. When the counter reaches zero count all of the data previously correctly received will have been spilled out of decoder buffer 22 without being passed to data sink 24. Thus, the same data received twice by the terminal is only passed to the data sink 24 once.

Figure 2:
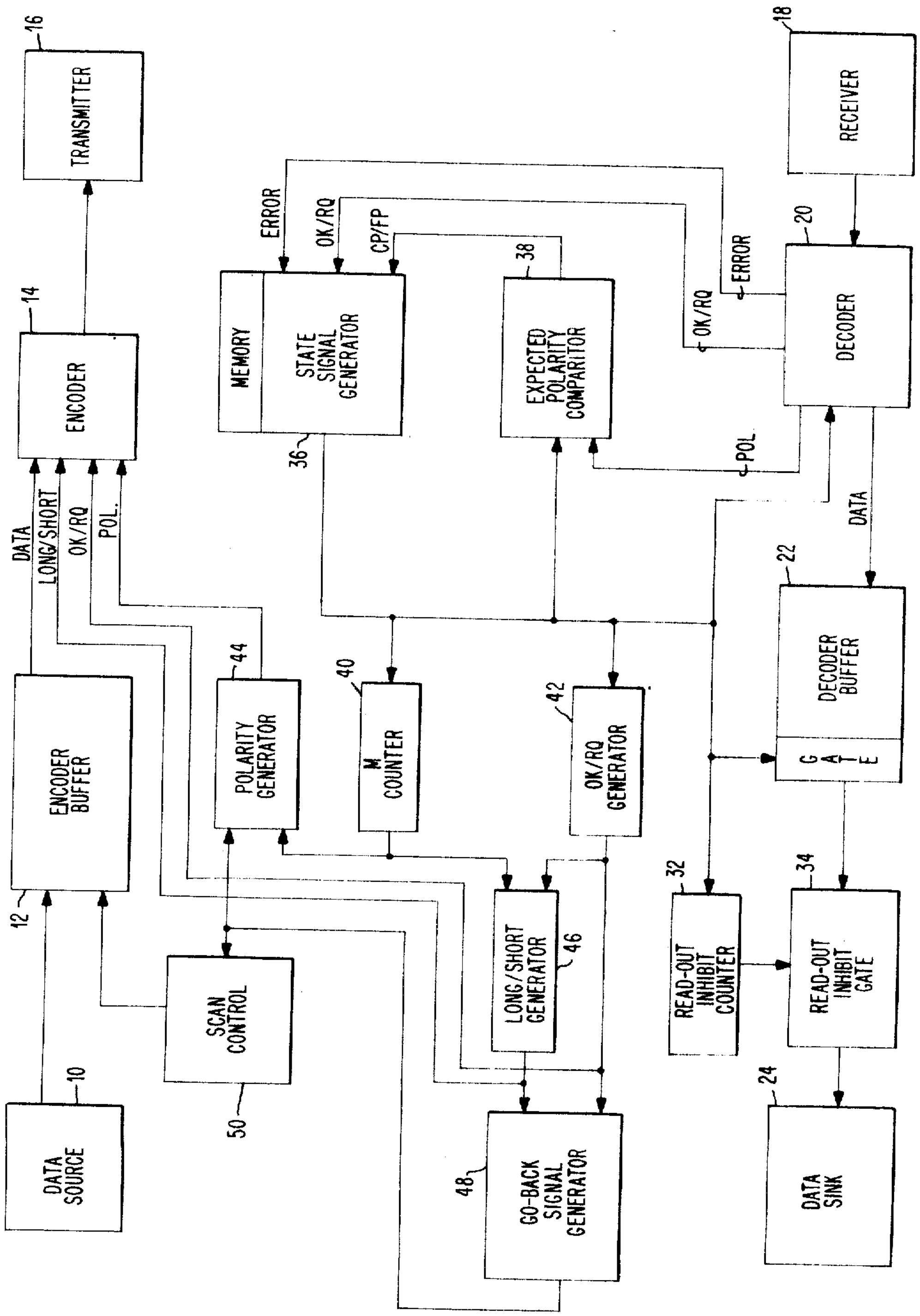
FIG. 2 shows the terminal of FIG. 1 in more detail with more functional blocks.

Referring now to FIG. 2 a block diagram shows more details of the adaptive control portion 8 (FIG. 1) of the terminal. The monitor 26 (FIG. 1) includes in FIG. 2 state signal generator 36 and expected polarity comparator 38. The mode signal generator 28 (FIG. 1) includes in FIG. 2 the counter 40, the OK/RQ generator 42, the polarity generator 44, and the long/short generator 46. The go-back scan control 30 (FIG. 1) includes in FIG. 2 the go-back signal generator 48 and the scan control 50. Before examining the function of these devices and their cooperation with the transmitter and receiver portions of the terminal it is best to examine the structure of the message block being used and the rules of operation for the terminal.

First, with regard to the structure of the message block, the format for the preferred embodiment is shown in FIG. 7. Message block A, shown at the top of the page as being transmitted from the East terminal, has *n* binary bits. The message block is divided into data bits, redundant error-checking bits and two signal bits. In FIG. 7, the number of data bits is indicated as K, and the number of redundant bits is indicated as *r*. The two signal bits separate the data bits and the redundant check bits; one bit is the OK/RQ signal, while the other bit is the mode synchronzing signal or polarity bit. The polarity bit takes on the value of one or zero and alternates in value from message block to message block.

Each terminal adapts its mode of operation to the quality of the transmission link by changing the length of the message block. For example, long blocks are transmitted when the data transmission link is operating in favorable conditions, while under adverse conditions the system is adapted to transmit short message blocks. The format of short and long message blocks is the same as previously discussed for FIG. 7. However, the short blocks contain fewer bits and the ratio of redundant bits to data bits is higher in the short blocks than in the long blocks.

Secondly, with regard to the rules of operation of the terminal, reference is made to FIGS. 5 and 6. The rules of operation for the terminal are carried out as called for by the states of operation of the terminal. The seven states of operation of the terminal are shown in the state diagram of FIG. 5 as short block states S1, S2, S3, S4, and S5 and long block states, L1, and L2. The terminal changes states in accordance with the OK/RQ and mode synchronizing signals it receives and with the errors it detects. In FIG. 5, E denotes error, RQ denotes request-retransmit, OK denotes confirmation, and CP and FP denote, respectively, correct polarity and false polarity hereinafter explained. The state diagram shows how the received signals trigger the terminal into different states of operation. For example, if the terminal is in the state S3 and receives a message block with OKCP, okay-correct polarity, the terminal changes to state S1.

Receiver rules of operation for the terminal are shown in the chart of FIG. 6. For example, in state S2, the OK/RQ generator, hereinafter described, sends an RQ to encoder 14 (FIG. 1); the decoder buffer 22 (FIG. 1) does not read out; the expected polarity sequence hereinafter discussed is unchanged; the read-out inhibit counter 34 (FIG. 1) is not set; decoder 20 (FIG. 1) treats the next message block as a short length block. All the terminal states have corresponding rules of operation as FIG. 6 shows.

In addition, the terminal also operates in accordance to the following general rules.

(1) If more than one change in state occurs during transmission of a long message block, the OK/RQ generator, hereinafter described, generates the OK or RQ signal only on the first change.

(2) With two exceptions, the series of transmitted message blocks contains an alternating sequence of polarity bits hereinafter explained; there is one polarity bit for each message block and the bits in succeeding message blocks alternate in binary value.

(3) First, exception to general rule 2: When the terminal receives the Mth consecutive correct short message block, it inverts the polarity bit of the short message block being transmitted.

(4) Second exception to general rule 2: When the terminal inserts a blank short message block, it inverts the polarity bit sequence starting with that block.

(5) When the OK/RQ generator, hereinafter described, generates an RQ signal, the go-back scan control 30 (FIG. 1) backspaces the read-out from the encoder buffer 12 (FIG. 1) to the data contained in the last two transmitted message blocks.

(6) When the last two transmitted message blocks, referred to in general rule 5, are a short block and a long block transmitted in that order, the terminal inserts a blank short block before retransmitting the data in the short block and long block.

(7) During transmission of inserted blank short blocks, the go-back scan control 30 (FIG. 1) ignores receipt of an RQ signal from the OK/RQ generator hereinafter described.

(8) When the terminal receives the Mth consecutive correct short message block, it changes the format of transmitted message blocks to the long block mode starting with the next transmitted message block.

(9) When the terminal receives an RQ signal or detects an error, it changes the format of transmitting message blocks to the short block mode starting with the next transmitted message block.

The operation of a terminal in an Adaptive Dual RQ system in accordance with the above rules of operation is more clearly understood by examining the structure of FIG. 2 and the operative examples of FIGS. 8 to 12.

Now again referring to FIG. 2, a terminal in an Adaptive Dual RQ system functions as follows. Receiver 18 receives the transmitted signal from the other terminal and demodulates it to retrieve the message block. Decoder 20 receives the message block from receiver 18 and passes the data on to decoder buffer 22. In addition decoder 20 detects the OK/RQ bit and the polarity bit and uses the redundancy bits to check the message block for an error.

From the decoder, the error signal and the OK/RQ signal are sent on to the state signal generator 36, while the polarity signal is passed to expected polarity comparator 38. State signal generator 36 generates state signals which control the state of operation of the terminal. Expected polarity comparator 38 is responsive to these state signals to generate an expected polarity signal. The polarity signal from decoder 20 normally corresponds to this expected polarity signal. If the two polarity signals do correspond the comparator outputs a correct polarity signal; however, if they do not correspond, the comparator outputs a false polarity signal. This correct polarity/false polarity (CP/FP) signal is sent back to the state signal generator 36.

To generate state signals for controlling the terminal, the state signal generator 36 is responsive to the error, OK/RQ, CP/FP signals and also a state signal stored in memory which indicates the state the terminal is presently in. The generator makes the decision based upon the present state and the receipt of the error, OK/RQ, and CP/FP signals to determine what the next state of the terminal should be. The decision making process of the state signal generator is shown in the state diagram of FIG. 5. There are seven states of operation for a terminal, but as an example, assume the terminal is in state S3 shown in FIG. 5. If the state signal generator 36 (FIG. 2) receives an OK and a correct polarity (CP) signal the generator 36 will send out a state S1 signal. If the generator 36 receives an OK and false polarity (FP) signal, it will send out a state S5 signal. Finally, if the generator receives an error signal or an RQ signal, it will send out a state S2 signal. When the new signal is sent out, the memory of the state signal generator is automatically updated to the new state.

Decoder 20, counter 40, OK/RQ generator 42, decoder buffer 22, and read-out inhibit counter 32 (FIG. 2) are all responsive to the state signals. FIG. 6 shows a table which gives the responses of all of these devices except the counter 40 to the different state signals.

Decoder 20 (FIG. 2) is responsive to the state signals according to the chart in FIG. 6 to change its operation to decode long or short messages blocks. For example, the decoder 20 treats the next message as a long message block if the state signal is L1 or L2, and it treats the next message as a short message block if the state is S1, S2, S3, S4, or S5. If the decoder is not changed to the block length of the incoming message block, the decoder will decode the message blocks as being in error.

Decoder buffer 22 (FIG. 2) is responsive to the state signals as shown in FIG. 6 to gate out data which has been indicated by the state signal generator as being error-free. Data is indicated as error-free if the state signal is L1, L2, S1 or S5. Data not gated out is replaced by incoming data. Read-out inhibit counter 32 and read-out inhibit gate 34 (FIG. 2) are responsive to state signal S5 to block the passage of data to the data sink 24 if the data has been previously correctly received.

The OK/RQ generator 42 (FIG. 2) is responsive to the state signals to generate an OK or an RQ signal (per FIG. 6) for insertion in the transmitted message block. Generally the generator 42 sends out an OK signal unless the state signal generator 36 indicates by states S2 and S4 that it has received an RQ or an error signal.

Counter 40 (FIG. 2) is responsive to state signals S1, S3, and S5 to count the number of consecutive correct short message blocks. If the chain of correct consecutive message blocks is broken by a message block having an error, the counter is reset to zero by state signal S2 and S4. The counter 40 has a given capacity denoted as M. On the M count, the counter generates an output signal indicating M consecutive correct short message blocks have been received.

The long/short generator 46 (FIG. 2) is responsive to counter 40 and OK/RQ generator 42. The long/short generator 46 outputs a "long" signal when it receives the M count signal from the counter 40. This "long" signal is used to change the length of the message block being encoded by encoder 14 to long blocks. The change to long message blocks being keyed by the M count signal occurs after the counter 40 has counted M consecutive correct short message blocks received. On the other hand, if the long/short generator 46 receives an RQ signal from the OK/RQ generator 42, the generator 46 will output a "short" signal. This "short" signal will act to change the length of the message blocks being encoded by encoder 14 to short length blocks.

Go-back signal generator 48 (FIG. 2) is responsive to the long/short generator 46 and the OK/RQ generator 42. The go-back signal generator 48 indicates to scan control 50 how much data must be retransmitted in the event that the go-back signal generator has received an RQ signal from the OK/RQ generator 42. If the terminal is in the long block mode when the RQ is received from the OK/RQ generator 42, the signal from go-back signal generator 48 will indicate go-back 2 long blocks. If the terminal is in the short block mode when an RQ is received from the OK/RQ generator 42, the go-back signal generator 48 will indicate go-back 2 short blocks. Finally, if the terminals has just transmitted a single long block when the RQ is received from the OK/RQ generator 42, the generator 48 will indicate go-back one long block and one short block. Scan control 50 is responsive to these go-back signals to control how much data the encoder buffer 12 passes on to the encoder 14 for retransmission.

Polarity generator 44 (FIG. 2) is responsive to counter 40 and go-back signal generator 48 to generate a mode synchronizing signal or polarity bit. The polarity bit normally alternates in binary value for successive transmitted message blocks in which it is inserted. However, polarity generator 44 is responsive to counter 40 to generate a single polarity bit in the polarity sequence which has inverted polarity. This event occurs when the counter 40 generates an M count signal indicating the receipt of M consecutive correct short message blocks. As previously pointed out, the M count also causes the long/short generator to send out a "long" signal to change the mode of operation of the encoder 14 to long message blocks. In effect, the polarity generator puts a false polarity bit into the last short message block to be transmitted to convey to the other terminal that this terminal is changing to the long block mode of operation starting with the next message block. This false polarity bit is detected by the other terminal's expected polarity comparator.

Polarity generator 44 (FIG. 2) is also responsive to the go-back signal generator 48 to invert the polarity sequence. In the unusual case where the go-back signal from the go-back signal generator is a go-back one long block and one short block, the scan control 50 and the polarity generator 44 act to keep the transmission system in proper polarity bit synchronization. Scan control 50 acts to insert one blank short block before the one short message block and the one long message block are passed out for retransmission. At the same time the polarity generator 44 does not alternate polarity for one short message block. In effect, the blank block which is inserted by the scan control 50 is given the same polarity bit as the preceding long block; thereafter, the polarity sequence continues in the normal manner. The effect is to invert the polarity sequence starting with the insertion of the blank short block.

Encoder 14 (FIG. 2) makes up the message blocks for transmission. It receives the data from encoder buffer 12, the long/short signal, the OK/RQ signal and the polarity bit. Whether the data is encoded into short or long message blocks depends upon the signal received from the long/short generator 46 as discussed previously. In addition, the encoder inserts into the message block the OK/RQ bit from the OK/RQ generator 42 and also the polarity bit from the polarity generator 44. The message block is then passed to the transmitter 16 for modulation and transmission.

OPERATIVE EXAMPLES

To best understand the operation of the invention, the five examples shown in FIGS. 8 to 12 are discussed below. To completely understand these operative examples, it is best to keep in mind the block diagram system shown in FIG. 2 and the state diagram in FIG. 5 along with its corresponding chart in FIG. 6.

FIGS. 8 through 12 each represent a different example of typical synchronization problems in Adaptive Dual RQ systems. Each figure shows the message sequences transmitted and received by an East and West terminal in a transmission link. For example, in FIG. 8 the East terminal is transmitting message blocks A, B, C, etc. A short time later the West terminal receives these message blocks A, B, C and is simultaneously transmitting its message blocks *a*, *b*, *c*, back to the East terminal. The East terminal receives the message blocks *a*, *b*, *c*, a short time after the West terminal has transmitted them. In addition to showing the message blocks, FIGS. 8 through 12 also include for each terminal a row which indicates the expected polarity (generated in the expected polarity comparator 38), the state of operation of the terminal and whether a received message block is read out.

With regard to the state signals, it is important to note that the state signals are pulses and are generated at the start of each new received message block at each terminal. For example, in FIG. 8 at the East terminal, the terminal changes to state L1 at the start of received message block *d*. However, the fact that the terminal has changed to this state was determined by the signals received in message block *c* by the East terminal. Thus, the state of operation of the terminal during receipt of the present message block is determined by signals in the preceding received message block.

*Example 1*

Figure 8:
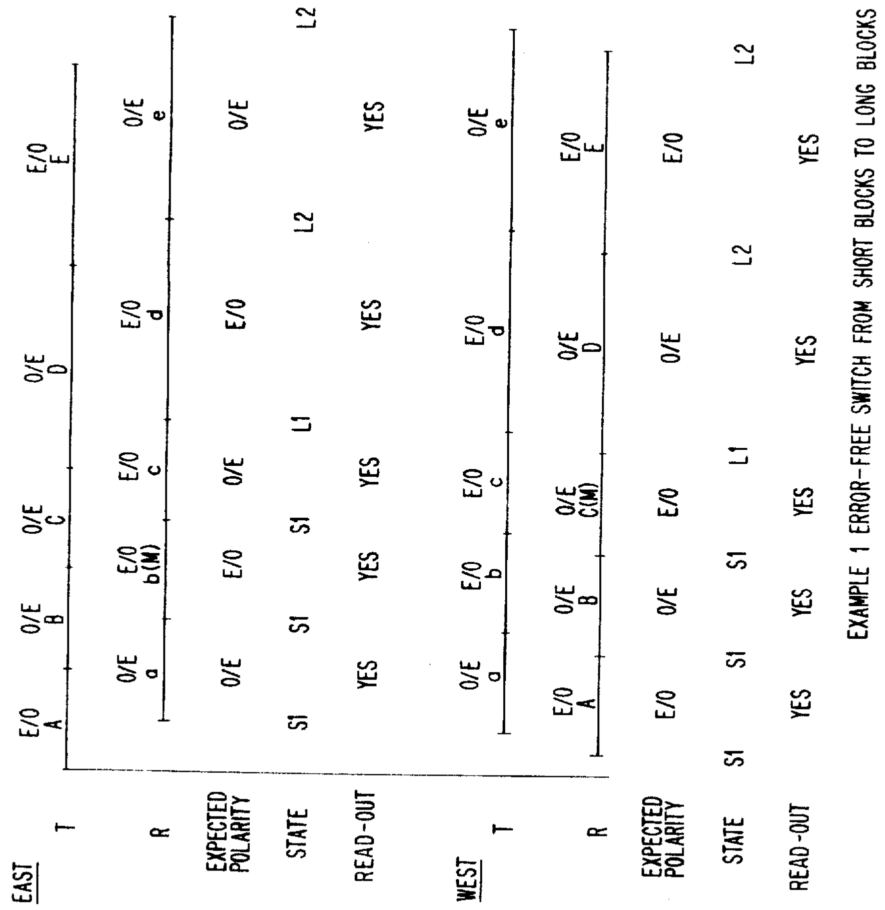

Example 1 shown in FIG. 8 represents error-free switch from short blocks to long blocks of the Adaptive Dual RQ system. The East receiver has, upon receiving small message block *b*, received M consecutive correct short message blocks. Accordingly, the counter 40 in FIG. 2 causes the polarity generator 44 to invert the polarity bit in the message block being transmitted by the East terminal. This is shown in FIG. 8 in that transmitted message block C, whose polarity should be even/odd, E/O, is inverted to be O/E. Also, as previously discussed, the M count signal causes the long/short generator 46 (FIG. 2) to generate a "long" signal to change the mode of operation of the encoder in the terminal to long blocks. Thus, in FIG. 8 at the East terminal, the next transmitted message block D is in the long block mode.

Now, examining the West terminal in FIG. 8, received short block C, as pointed out above, contains the inverted polarity and therefore will cause the expected polarity comparator 38 at the West terminal to generate a false polarity signal. The okay-false polarity (OKFP) signal changes the state of the West terminal from S1 to L1. The West terminal in state L1 switches its decoder to the long block mode for the next received message block. In addition the received short block C is the Mth consecutive correct short block received by the West terminal. Therefore West terminal also inverts the polarity of transmitted short message block *c*.

When short message block *c* is received back at the East terminal its inverted polarity will cause the East terminal's expected polarity comparator 38 to generate a false polarity signal. This will cause the East terminal to change to state L1 so that it will decode the next received message block from the West terminal as being in the long block mode.

In summary each terminal in FIG. 8 has changed its encoding operation to the long block mode of transmission because it has received M correct consecutive short message blocks. Also each terminal has changed its decoding operation to the long block mode because it received a false polarity indication in the message block from the other terminal. Finally, all the message blocks indicated in FIG. 8 are read out because they contained no errors.

*Example 2*

Figure 9:
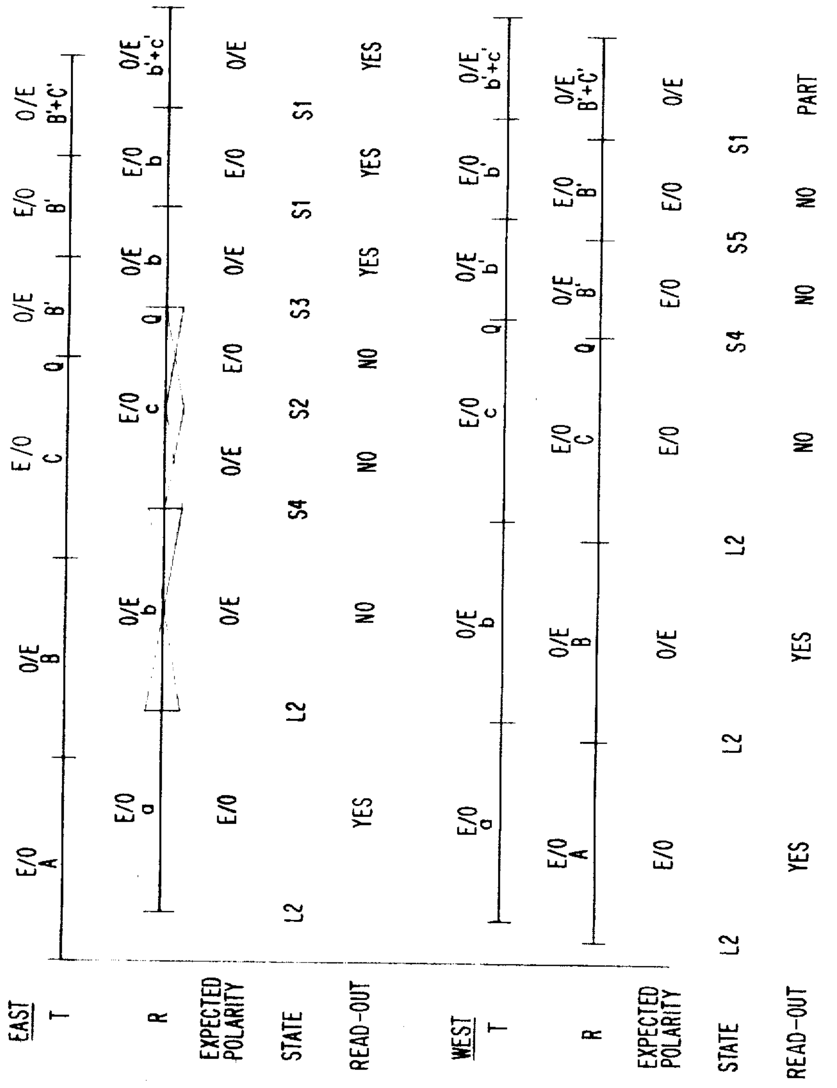

Example 2 shown in FIG. 9 indicates the operation on message blocks when there is a switch from long blocks to short blocks with a single error. Both terminals, before the error, are in state L2. The East receiver does not properly receive long message block *b* and accordingly, the decoder puts out an error signal which causes the East terminal at the start of the next received message block to change to state S4. In state S4, the terminal inserts an RQ signal in transmitted message block C, changes its decoder 20 to short block operation, inverts the expected polarity sequence generated by expected polarity comparator 38 and blocks read-out from decoder buffer 22 of received message block *b*. In addition the adaptive control portion of the terminal operates on the encoder 14 to change it to the short block mode of operation and on the encoder buffer 12 to cause it to gate out data in previously transmitted message blocks B and C for retransmission. Retransmission is shown at the East terminal by denoting the short message blocks transmitted after the long blocks as B′ and C′. The small message blocks B′ contain the same data as previously transmitted long message block *b*. The third transmitted short block contains a combination of data from previously transmitted long message blocks B and C and therefore is denoted as B′+C′. The reason for this combination is that a long block contains more data than two short blocks so retransmission of data from a long block requires two short blocks and part of a third.

The West terminal first learns that the East terminal has detected an error when it receives message block C containing an RQ bit. Receipt of this message block causes the West terminal to change from state L2 to state S4. In state S4, the West terminal inserts an RQ bit in its transmitted message block *c*, changes the mode of operation in the encoder 14 to short message blocks by acting through long/short generator 46 (FIG. 2), changes the mode of operation of decoder 20 to short blocks, inverts the expected polarity sequence generated by expected polarity comparator 38 and blocks read-out from decoder buffer 22 of message block C which contained the RQ bit.

The West terminal begins to retransmit in short message block format data previously transmitted in long blocks *b* and *c*. This is shown on the transmitting line of the West terminal as short message blocks *b'* and *b'*+*c'*.

During retransmission the West terminal is receiving the retransmitted data from the East terminal. The first received short message block B' has a polarity O/E whereas the expected polarity, having been inverted by state S4, is E/O. Thus, the expected polarity generator 38 will output a false polarity signal. The okay-false polarity OKFP signal for the first short message block B' causes the state of the West terminal to change from S4 to S5. In state S5, the West terminal again inverts the expected polarity sequence in the expected polarity comparator 38. Accordingly, when the second small message block B' is received with a polarity E/O, the polarity agrees with the expected polarity E/O. Thus the okay-correct polarity OKCP signal causes the West terminal to change from state S5 to S1. While in state S5 the West terminal has set the read-out inhibit counter 32 whose function has previously been discussed. The result of setting the counter is to block read-out of data previously read out when long message block B was received. Since message block B was read out, the data in the two short message blocks B', and the B' part of the small message block B'+C' is blocked from a second read-out by the read-out inhibit counter 32.

Returning to the East terminal, that terminal next receives long message block *c* with an RQ bit. However, since the decoder 20 (FIG. 2) has been changed by state S4 to the short message block mode the long message block *c* is decoded as two erroneous short message blocks. The first erroneous short message block causes the East terminal to change from state S4 to S2. In state S2, the terminal blocks the read-out of the first half of long message block *c* from decoder buffer 22. Also, in state S2, the East terminal would normally insert an RQ in the message block being transmitted; however, since the preceding long message block has already caused insertion of an RQ signal into the message block being transmitted, this second state signal occurring during the same transmitted message block is ignored by the OK/RQ generator 42 (FIG. 2).

During the second half of the received message block *c*, which is also detected as an error, the East terminal automatically changes from state S2 to S3. In state S3, the second half of received long message block *c* is not read out of decoder buffer 22. During S3 the East terminal receives retransmitted short message blocks *b'*. Note that the polarity bit of this short message block is O/E and correctly corresponds with the expected polarity O/E. This would not have occurred but for the fact that in state S4 the East terminal inverted its expected polarity sequence. This inversion compensated for the fact that the expected polarity sequence was operating as if the received message block *c* was two short blocks when in fact it was a single long block. Because of the inversion, the East terminal properly receives the first small message block *b* with correct polarity and accordingly the terminal changes from state S3 to S1. Thereafter, the East terminal remains in state S1 and the retransmitted data in message blocks *b'* and *b'*+*c'* are read out.

*Example 3*

Figure 10:
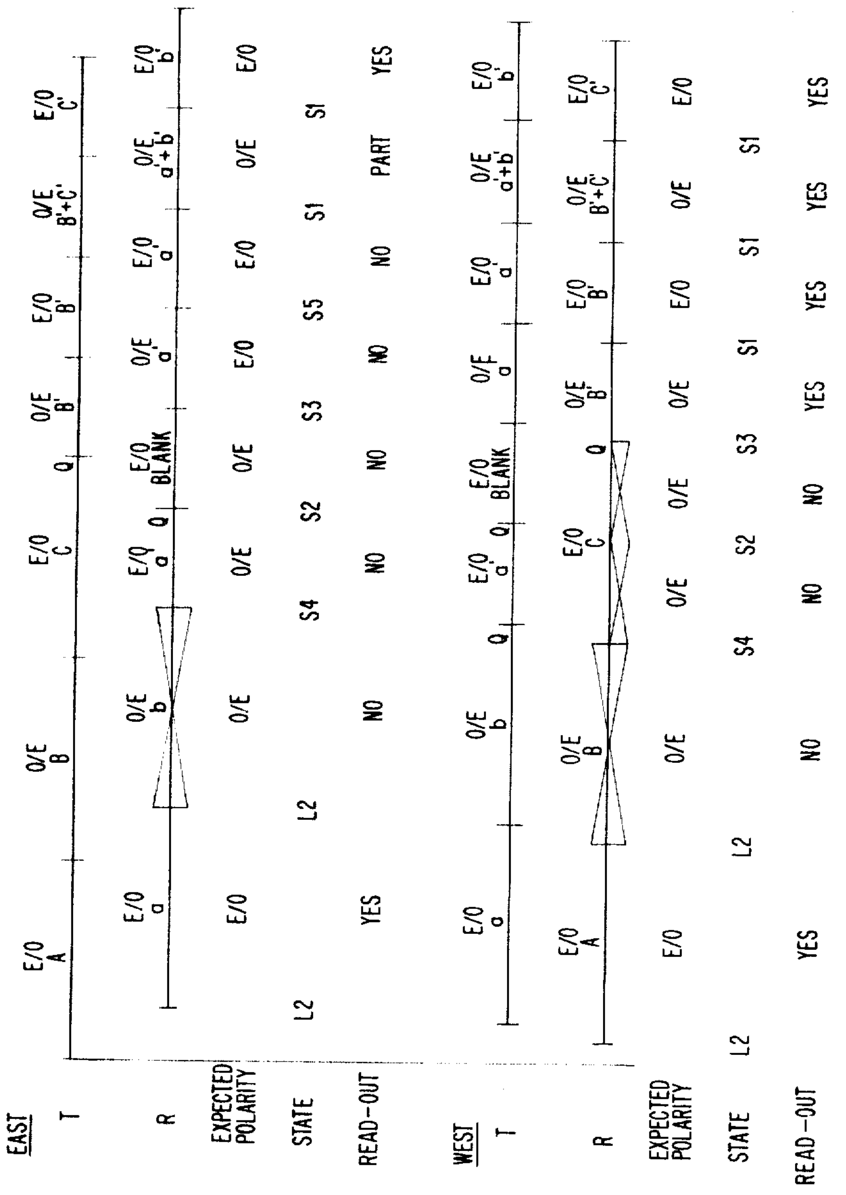

Example 3 shown in FIG. 10 indicates the operation of an Adaptive Dual RQ system switching from long blocks to short blocks with two errors during the operation. Initially both of the terminals are operating in state L2, the long block mode of operation. The first error is received by the West terminal when it decodes long block B. The West terminal then switches to state S4. In state S4, the West terminal inserts an RQ in transmitted message block *b*, changes the mode of operation in the encoder 14 to short blocks, changes the mode of operation in decoder 20 to short blocks, inverts the expected polarity in the expected polarity comparator 38, blocks read-out from decoder buffer 22 of data in received message block B and retransmits in short blocks part of the data in previously transmitted long message block "*a*." This is denoted in FIG. 10 at the West terminal's transmitting line as the first short block *a'*.

At the East terminal the receiving portion receives long message block *b* in error. And accordingly the terminal changes from state L2 to S4. In state S4 the terminal inserts an RQ signal in transmitted message block C, changes the mode of operation of the encoder 14 of the terminal to short blocks, retransmits the data previously transmitted in long message blocks B and C, changes the mode of operation of the decoder 20 of the East terminal to short blocks, inverts the expected polarity sequence in the expected polarity comparator and inhibits read-out of the data in message block *b* from decoder buffer 22.

The next message block received is short block *a'* containing an RQ signal. This causes the East terminal to change from state S4 to state S2. In state S2, the terminal normally inserts an RQ into its transmitting message block however this is the second state signal during the same transmitted long message block and is accordingly ignored. State S2 does cause the decoder buffer 22 to block read-out of data in short message block *a'*.

Referring again to the West terminal, it next receives, after erroneous long block B, the long block C. Since the decoder 20 has changed to the short block mode of operation long block C will be detected as two erroneous short blocks. The first half of long message block C causes the West terminal to change from state S4 to S2. In state S2 the West terminal inserts an RQ signal in short block *a'* and also activates scan control 50 (FIG. 2) to cause retransmission of the data in short message block *a'* and data previous to that. However, since there is no data previous to the data in message block *a'*, because this is the same data as in message block "*a*," which was the first message block, a blank short block is sent prior to retransmitting message block *a'*. If there had been data previous to "*a*," then that data would have been retransmitted in this blank short message block. During transmission of the blank short message block the West terminal is automatically changing from state S2 to S3. Thereafter, the West receiver receives correct data and moves from state S3 to S1 to continue short block operation. During this short block mode of operation the encoder of the West terminal is retransmitting the previously transmitted data in long message blocks "*a*" and *b*. The retransmitted data is shown as being transmitted as short blocks *a'*, *a'*+*b'*, and *b'*.

Meanwhile, at the East terminal the short message block *a'* with the RQ bit is received and causes the East terminal to change to state S2. Being in state S2 when the blank short message block is received, the East terminal automatically moves to state S3 and ignores the blank message block. During state S3 the East terminal again receives the retransmission of short message block *a'*. The polarity bit in this message block is O/E whereas the expected polarity having been inverted by state S4 is E/O. Accordingly, the okay-false polarity (OKFP) signal will cause the East terminal to change to state S5 at the end of this short message block. In state S5, the East terminal sets the read-out inhibit counter 32 to block read-out of data previously read out when the long message block "*a*" was received. In state S5, the East terminal receives the second small message block *a'* which has okay-correct polarity (OKCP) since the expected polarity is inverted by state S5. Therefore, the East terminal changes from state S5 to S1 and continues to operate in the short message block mode.

*Example 4*

Figure 11:
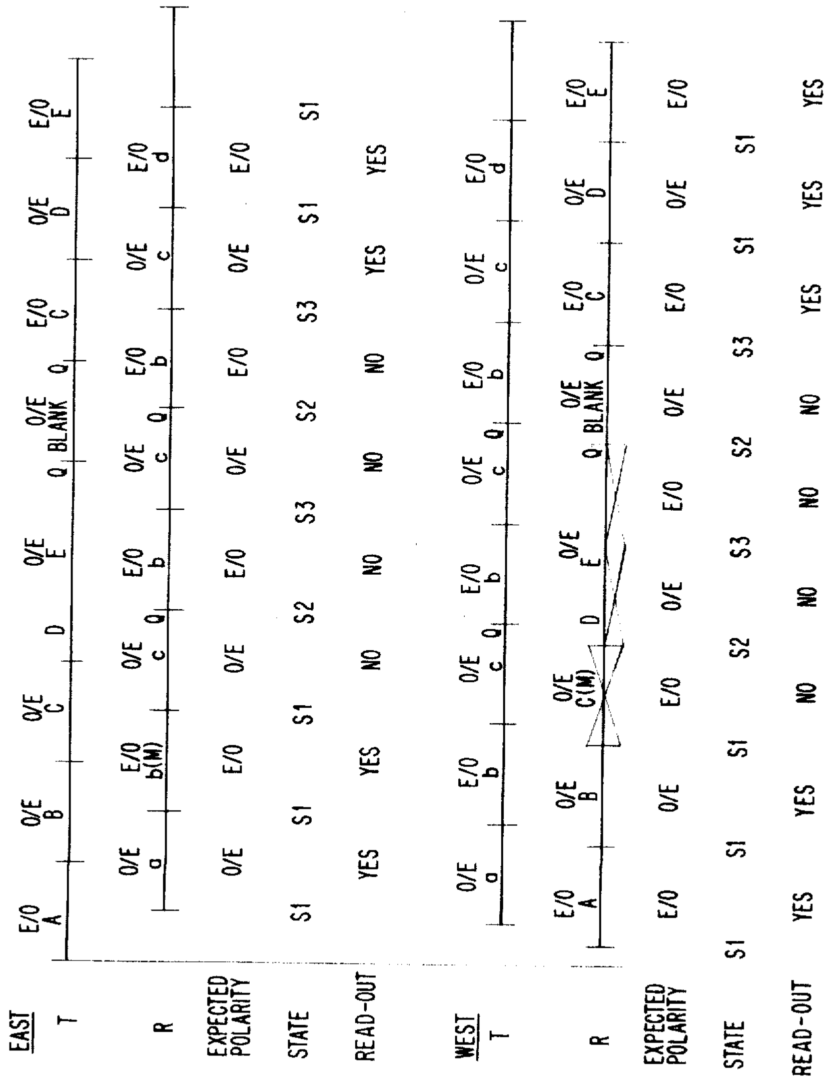

Example 4 shown in FIG. 11 indicates the operation of an Adaptive Dual RQ system when an error occurs in the received short block immediately preceding the first received long block at a terminal. Initially both the East and West terminals are operating in the S1 state. However, the West terminal receives short block C in error. Short block C would have been the Mth consecutive correct short message block that the West terminal had received; however, since the short block was in error the counter 40 will be reset to zero and the encoder 14 is the West terminal will not change to a long block transmission mode. The occurrence of the error in message block C causes the terminal to change from state S1 to S2. In state S2, the West terminal inserts an RQ in message block *c* being transmitted, starts retransmission of the data previously transmitted in short blocks *b* and *c*, and blocks read-out of data in erroneous short message block C.

At the East terminal short message block *c* is received with its RQ signal. The East terminal has just changed to transmitting long message blocks because the previous short message block *b* was the Mth correct consecutive received short message block. Accordingly, the East terminal is transmitting its first long message block denoted as D and E when the terminal receives the RQ signal in short message block *c*. Receipt of the RQ signal causes the terminal to change from state S1 to S2. In state S2 the East terminal inserts the RQ signal in long message block DE, prepares for retransmission of the data in short message block C and long message block DE, and blocks read out of short message block *c* from decoder buffer. After long block DE, a blank short block is inserted, the polarity sequence is inverted, and the retransmission begins.

At the West terminal short message block C which was detected in error contained the false polarity signal which would have caused the West terminal to change its decoder 20 to the long block mode. However, since this message block was in error, the false polarity signal was not detected and the West terminal's receiver remained in the short message block mode. Thus, when long message block DE was reecived, it was detected as two erroneous short message blocks. During receipt of the D portion of the long message block the West terminal automatically changes to state S3. During receipt of the E portion of long message block the West terminal changes from the state S3 to S2 because the short block decoding operation indicates an erroneous message block. Because the long block DE is decoded as two erroneous short blocks, the RQ signal in long block DE is ignored. During states S3 and S2 the West terminal does not print out the erroneously decoded long block message DE. Being in state S2 at the end of the long block, the West terminal inserts an RQ signal in transmitted message block *c* and again causes the terminal's encoder buffer 12 to read out for retransmission the data in short message blocks *b* and *c*.

At the East terminal the first short message block *c* is properly received but, because of the RQ signal therein is not printed out. The next short message block *b* is received during the East terminal's automatic change from state S2 to S3, and because of the state S3 signal message block *b* is not read out. However, this message block has previously been read out when it was received before while the terminal was in the state S1. After the second receipt of small message block *b*, the East terminal receives for the second time small message block *c*, which again has an RQ signal in it. The RQ signal causes the terminal to change from state S3 to S2. In state S2, the East terminal again blocks read-out of data in a short message block *c*, inserts an RQ signal in the transmitted short blank message block. State S2 does not cause the encoder buffer 12 to go back further for retransmission because the RQ, signalling the go-back for retransmission, occurs during transmission of the inserted blank short message block and is therefore ignored. Accordingly, the next transmitted message block is the retransmission of short message block C followed by short blocks D and E, the retransmission of long message block DE. Note that the polarity sequence during transmission of the blank short message block has been delayed one message block effectively inverting the sequence. The blank message block has the same polarity as the preceding long message block and thereafter the polarity alternates as usual.

At the West terminal the blank short message block is received when the terminal is changing automatically from state S2 to S3 and because of the state S3 signal the blank is not read out. After the blank short message block, short message blocks C, D, and E are correctly received with correct polarity and are accordingly read out. The West terminal continues to operate in state S1, the short block mode.

*Example 5*

Figure 12:
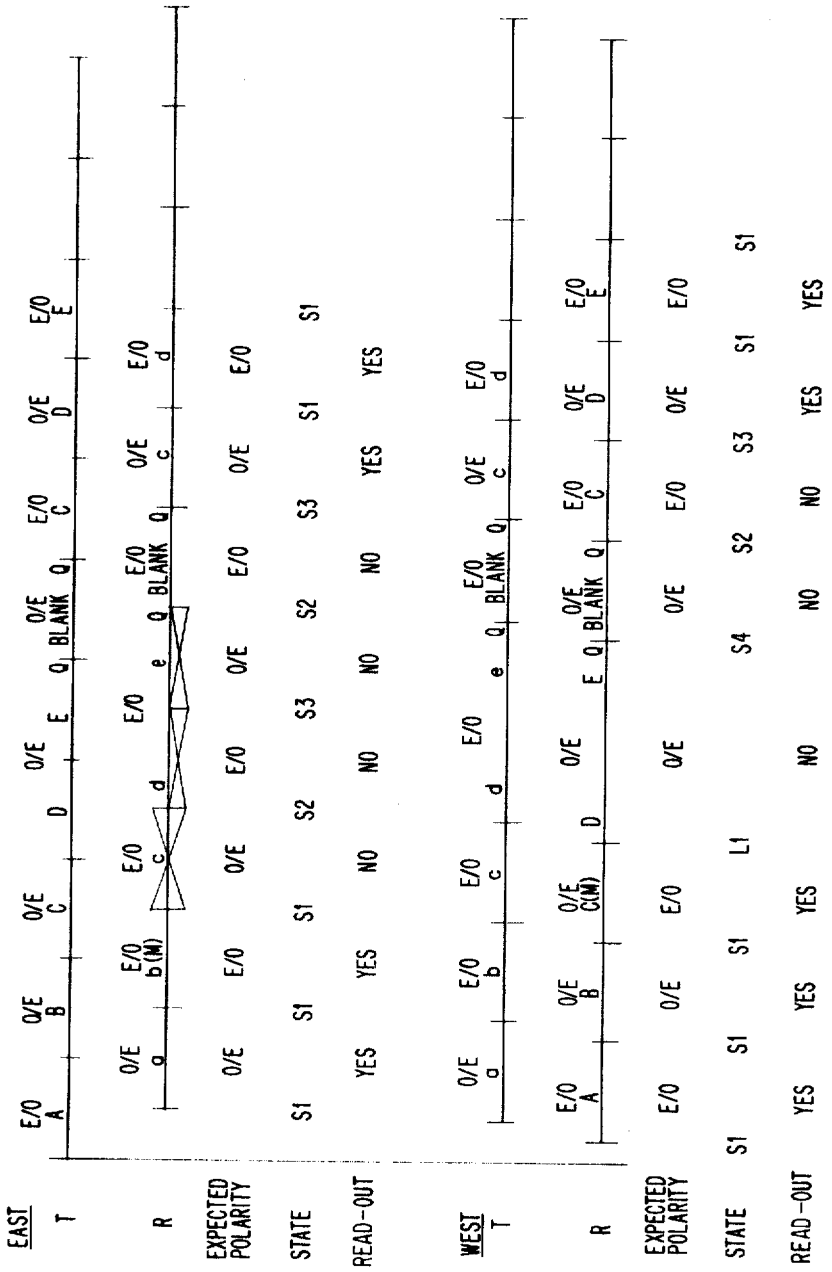

Example 5, shown in FIG. 12 indicates the operations of an Adaptive Dual RQ system when a terminal receives an incorrect short message block while its encoder 14 is changing to long message block mode. Initially both the East and West terminals are operating in state S1. The East terminal receives short message block *b* which is the Mth correct consecutive short message block. Therefore, the East terminal inverts the polarity of the short message block C being transmitted and prepares to transmit long message blocks thereafter. However, the next short message block received by the East terminal is in error which causes the terminal to change from state S1 operation to state S2 operation. In state S2 the East terminal inserts an RQ signal in long message block DE being transmitted, signals the encoder to switch back to short blocks, prepares for retransmission of the data in the long block DE and the short block C after inserting a blank short block and blocks read out of the data in erroneous message block *c*. At the West terminal short message block C is the Mth consecutive correct short message block received by the West terminal and accordingly the encoder at the West terminal is signaled to change to the long block mode while the short message block being transmitted has its polarity bit inverted. In addition, the West terminal also detects a false polarity signal from received short message block C and accordingly changes its state of operation from S1 to L1. In state L1 the West terminal changes its decoder 20 to the long block mode of operation.

When the West terminal next receives long message block DE it is in the long message block mode of operation and accordingly the long message block is properly received. This received long message block contains the RQ signal from the East terminal which causes the West terminal to change its state of operation from L1 to S4. In state S4, the West terminal inserts an RQ into its transmitted long message block *de*, prepares for retransmission of the data in short message block *c* and long message block *de* in short blocks and inserts a blank short message block prior to the retransmission.

At the East terminal the long message block *de* is detected as being two erroneous short message blocks since the East terminal did not change its decoder 20 to the long block mode of operation because the inverted polarity bit to signal such a change was in the previous short block which was received in error. During receipt of the "*d*" half of long message block *de*, the East terminal is automatically changing from state S2 to S3. During receipt of the "*e*" half of long message block *de*, the East terminal changes from state S3 to S2 because the message block is detected as being in error. The East terminal being in state S2 inserts an RQ signal in the blank message block it is transmitting prior to retransmission of data. As pointed out in the previous example, the East terminal would normally start a go-back retransmit operation as a result of detecting the error. However, the go-back operation is not performed here because the error is detected while the terminal is transmitting an inserted blank shoot message block. The message blocks transmitted thereafter are short blocks C, D, and E whose retransmission was initially ordered as a result of receiving short message block *c* in error. Note that the transmitted polarity sequence has been inverted by assigning the blank short message block the same polarity as the previous long block and continuing to alternate the sequence thereafter.

At the West terminal the blank short message block is received correctly but since it contains an RQ signal the West terminal changes its state of operation from state S4 to S2. In state S2 the terminal inserts an RQ in its blank short message block being transmitted and continues on the retransmission of previously transmitted data in the same manner as the East terminal did. The receiver at the West terminal receives a short block C while changing from state S2 to S3 and therefore short block C is not read out. The data in short message block C has been previously read out anyway. In state S3, the West terminal receives short message block D correctly and changes to state S1. Thereafter, the West terminal operates in the state S1 reading out received data.

The East terminal receives the blank short message block from the West terminal while the terminal is automatically changing from state S2 to S3. In state S3 the East terminal receives short message block *c* correctly and changes to state S1. Thereafter, the East terminal continues to operate in the short block mode of operation reading out received data.

DETAILED DESCRIPTION

FIGS. 3*a* to 3*d*, when properly pieced together, form a detailed logic block diagram of a terminal in an adaptive dual request-retransmit data transmission system. Portions of the complex system may be separately considered as performing the functions of the blocks shown in FIG. 2. As a simple example, decoder 20 (FIG. 2) includes in FIG. 3 decoder 52 and decoder block length counter 54. Since the overall operation of terminals has been previously discussed with regard to FIG. 2, this detailed description will deal only with the detailed operations of the apparatus in FIG. 3 as it corresponds to a functional block shown in FIG. 2.

*Timing*

Receiver 18 shown in FIG. 3 in addition to demodulating the received signal also detects a timing signal. The timing signal is used to slave the receiving portion 9 (FIG. 1) of the terminal to the transmitting portion 7 (FIG. 1) of the other terminal in the transmission link. In addition this timing signal when fed to the decoder block length counter causes the counter to generate an $r+2$ count signal. This $r+2$ count signal is used to turn on the master clock 56 (FIG. 3) in the transmitting portion of the terminal if the master clock has not already been manually turned on. The reason for turning the transmitter master clock on at the $r+2$ count can best be seen by examining FIG. 7.

FIG. 7 shows the detailed time relationship between transmitted and received messages of two communicating terminals, East and West. For sake of simplicity, we shall assign the duration of a data bit as being one unit of time. Therefore, a message block has a duration of length $n$. The data bits occur in the first part of the message block for a length of time K. The combined duration of the polarity bit and the OK/RQ bit is 2 and the duration of the redundancy check bits is a total of $r$.

As previously pointed out, the OK/RQ bit and the polarity bit represent the control signals which keep the two terminals coordinated both in mode of operation and in data retransmitted. For sake of simplicity in this discussion of the timing, these signals will be referred to as the confirmation signals. As explained in the general description, the confirmation signals are generated as a result of the state signals. The state signals are pulses out of the state signal generator which occur at the end of a received message block. Therefore, since the confirmation signals are dependent upon the state signals they will not occur until the end of a received message block.

To be able to insert these confirmation signals in the message block to be transmitted, the timing of the transmitted message block must be such that the confirmation signal time does not occur until after the end of the received message block. This may be seen in FIG. 7 at the East terminal. Note in FIG. 7 that a message block is indicated as the distance between two large vertical marks on the timing diagram for a receiver or transmitter. The grouping of three smaller vertical marks repesents the confirmation signals in a message block. Referring now to message block "*a*" being received at the East terminal note that the end of message block "*a*" is much in advance of the confirmation signals in the transmitted message block B of the East terminal. With this favorable time relationship between received message block "*a*" and transmitted message block B the confirmation signal may be properly inserted in message block B. Message block *a'* indicated as being received at the East terminal represents the latest that a message block being received at the East terminal will still be able to trigger confirmation signals for insertion into transmitted message block B. As can be seen the end of message block *a'* is just prior to the confirmation signal time of transmitted message block B.

As pointed out previously, the preferred embodiment is based upon a go-back two blocks retransmission in the event that a terminal receives an RQ signal. This go-back two operation inherently places a limitation on the time it takes for a message from one terminal to pass to the other terminal. For example, referring to FIG. 7, the received message block "*a*" at the East terminal will have to contain the OK/RQ signal which confirms or requests retransmission of transmitted message block A of the East terminal. The reason for this being that when message block "*a*" is being received at the East terminal, the East terminal is already transmitting message block B. Therefore, for the terminal to go back only two blocks and still pick up message block A for retransmission, the decision to retransmit must be made during transmission of message block B.

The time it takes to transmit a signal from the East terminal to the West terminal is indicated as $tD$ on the receiver line of the West terminal in FIG. 7. The question arises as to how large can $tD$ be before the message block "*a*" transmitted by the West terminal arrives too late at the East terminal to confirm or request retransmission of message block A. One of the factors in this determination is how soon can the West terminal start to transmit message block "*a*" after it had received message block A. An examination of the format of a message block reveals that this minimum time is equal to $r+2$. In other words, the West terminal can start transmitting message block "*a*" at a time $r+2$ after it begins to receive message block A. This operation will insure that the end of message block A occurs just prior to the time for insertion of the confirmation signals in the transmitted message block "*a*." Allowing for this minimum time interval $r+2$ for processing at West terminal and also allowing for two transmission intervals $tD$, one can easily derive the equation for the maximum transmission time $t'D$.

$$t'D=n/2-(r+2)$$

The operation of the dual request-retransmit system when the transmission time is at the maximum is also indicated in FIG. 7 by received message A' and transmitted message *a'* at the West terminal and received message *a'* at the East terminal. Note that received block *a'* has arrived back at the East terminal just prior to the time for insertion of the confirmation signals in message block B.

From the above discussion of FIG. 7, it can be seen that to provide the largest margin of safety with regard to transmission time, $tD$, it is desirable to slave the transmission timing of one terminal off the receipt of message blocks from the other terminal in the transmissional link. Referring now to FIG. 3, the master clock 56 and the OR gate 58 cooperate to provide the master-slave time relationship between terminals. If the terminal shown in FIG. 3 is to be the master terminal then the OR gate 58 would be pulsed by an ON signal which would start the clock and, in turn, start transmission. This would correspond to the East terminal (FIG. 7). However, if the terminal shown in FIG. 3 is to be slaved to the other terminal in the transmission link then the first indication that the terminal has that messages are being sent is the receipt of messages at receiver 18. The timing of these messages is fed to decoder block length counter 54 which generates the $r+2$ count. The $r+2$ count is then passed to OR gate 58 and acts to turn master clock 56 on and start transmission from the terminal. This would correspond to the West terminal (FIG. 7).

In summary, the timing of the receiving portion of a terminal is always slaved to the timing of the other terminal in the transmission link. Whereas the timing of the transmit portion of a terminal is supplied by master clock 56 which will be turned on either to initiate operation of the system or in response to the $r+2$ count. In the latter event the initiation of the system has been started at the other terminal.

*Decoder*

The decoder 20 (FIG. 2) includes decoder 52 and decoder block length counter 54 of FIG. 3. Referring to FIG. 3 the decoder 52 decodes the message from a message block and also detects the polarity bit, the OK/RQ bit, and checks the message block to see if it is in error. The message is passed on to decoder buffer 22 while the error signal is sent directly to the state signal generator 36. The OK/RQ bit is used to set flip-flop 60. The output of flip-flop 60 is passed on to the state signal generator; the polarity bit is used to set flip-flop 62 which is a part of the expected polarity comparator 38 (FIG. 2).

To control the timing and message block length that the decoder operates on, decoder block length counter 54 is provided. The counter operates in response to timing signals picked up by receiver 18. The counter generates an $r+2$ count which has been previously discussed. The counter also generates a zero count to indicate the start of message blocks and an end of data time so that the decoder will know what bits of the message will represent data bits.

The logic circuitry located immediately above the decoder block length counter is used to combine the OK/RQ signal and the correct polarity/false polarity signal to generate a combination signal okay-correct polarity (OKCP) or okay-false polarity (OKFP). These signals will be used by the state signal generator. Before examining the logic circuitry to generate these signals the expected polarity comparator which generates the correct polarity and and false polarity signals used in the logic circuitry will be examined.

*Expected polarity comparator*

The expected polarity comparator 38 of FIG. 2 includes in FIG. 3 flip-flop 62, binary trigger 64, OR gate 66, and Exclusive OR 68. The OR gate 66 and binary trigger 64 operate to generate the expected polarity. Binary trigger 64 changes its output each time it receives a pulse from OR gate 66. OR gate 66 is operated by states L1, L2, S1, S2, and S3. As previously pointed out (FIG. 6), states S4 and S5 invert the expected polarity. This is accomplished merely by not triggering binary trigger 64 when state signal generator generates states S4 and S5.

The other side of the comparator consists of flip-flop 62 which is storing the polarity bit received from the decoder 52. The polarity bit in flip-flop 62 is then compared with the expected polarity in the binary trigger 64 by means of Exclusive OR gate 68. The Exclusive OR gate generates an output when the expected polarity and polarity bit do not correspond, i.e., a false polarity signal. When the two polarities do correspond then the OR gate has no output. This is indicative of correct polarity.

Referring now to the logic circuitry used for generating the okay-correct polarity and okay-false polarity signal, the essence of the circuitry is AND gate 70 and AND gate 72. AND gate 70 generates the OKCP signal as a result of simultaneously receiving a correct polarity signal, an OK signal and a no-error signal. The correct polarity signal out of Exclusive OR 68 is inverted and passed to the AND gate 70. The OK signal from flip-flop 60 must also be inverted and passed to the AND gate 70. The no-error signal is the error signal inverted by inverter 74; from the inverter 74 it is passed to the AND gate 70. These signals occurring simultaneously will trigger the AND gate 70 to form an OKCP signal. AND gate 72 operates in the same manner as AND gate 70 to generate the OKFP signal except that the AND gate 72 is directly responsive to Exclusive OR 68. The reason being that the Exclusive OR has an output when there is a false polarity indication.

To reset the logic circuitry for receipt of the next message block signals, the zero count is delayed in delay 80 and then passed to the reset terminals of flip-flops 60 and 62. As will be discussed momentarily, the state signal generator operates to generate state signals on the decoder zero count. Therefore, flip-flops 60 and 62 must not be reset until after the decoder zero count triggers the state signal generator.

*State signal generator*

The details of state signal generator 36 (FIG. 3*b*) are shown in FIG. 4. The memory part of the state signal generator consists of the three flip-flops 82, 84, and 86. The logic circuits shown in FIG. 4 are used to generate the state signals according to the state diagram of FIG. 5. State signals indicated as S with Roman numerals represent voltage level state signals generated by the memory flip-flops, whereas state signals denoted as S with Arabic numerals represent pulse state signals which are the ultimate output of the state signal generator.

As an example of operation let us determine what logic is necessary to generate the state S1. First, note from the state diagram of FIG. 5, that it is desirable to generate a state signal S1 if the memory in the state signal generator contains any one of the following state signals, SI, SIII, SIV, and SV. From these states an OKCP signal will cause the state signal generator to generate an S1. Note that state S1 and state SI would have the same position on the state diagram in FIG. 5; these states only differ as previously pointed out in that S1 is a pulse signal whereas SI is a voltage level.

As an example let us assume we are in state S3 and the state signal generator receives an OKCP signal. Then it is desirable upon the next decoder zero count (beginning of next decoded message block) to generate a state signal S1. Accordingly, OR gate 88 in FIG. 4 would have an output because of state SIII being present. AND gate 90 would receive its input from OR gate 88 and in addition would receive the OKCP signal and also the zero count pulse. Upon receipt of the zero count pulse, the AND gate 90 generates a pulse signal indicating the state S1. This pulse signal is sent from the state signal generator 36 on the S1 output line (FIG. 3*b*) and is also used to reset the memory in the state signal generator to indicate state SI which the system has now changed to.

The other states are generated by the state signal generator in a similar manner with logic to generate the state signals in accordance with the state diagram in FIG. 5.

Referring again to FIG. 3, in response to the short block state signals S1 to S5, OR gate 90 in FIG. 3 operates to set the decoder block length counter 54 into the short block operation. State signals L1 and L2 operating through OR gate 92 cause the decoder block length counter 54 to be set to the long message block mode of operation.

To gate out decoder buffer 22, OR gate 94 is responsive to states L1, L2, S1 and S5. Output from OR gate 94 sets flip-flop 96 which when set will pass data bits through AND gate 98. Flip-flop 96 is reset by the end of data time pulse from the decoder block length counter 54. When flip-flop 96 is reset, AND gate 98 is closed down and the decoder buffer 22 is not read out.

The read-out inhibit counter 32 previously discussed has its count set by state S5. When state S5 acting through OR gate 94 sets flip-flop 96 read-out inhibit counter 32 then proceeds to count down. Zero count out of counter 32 is used to set flip-flop 100. When flip-flop 100 is set AND gate 102 passes data bits passed by AND gate 98 on to the data sink 24.

In operation the read-out inhibit counter 32 is normally on zero count and thus AND gate 102 would pass the data bits. However, when state signal S5 occurs, flip-flop 100 is reset and thereby AND gate 102 is shut down. Simultaneously, state S5 sets the count in read-out inhibit counter 32 and also triggers through flip-flop 96 the count down of read-out inhibit counter 32. The count originally set in the counter 32 is $K_L$ the number of data bits in a long message block. The counter will have to count down at the same rate as the data bits are being triggered out of the decoder buffer. Accordingly, the timing which has been passed by gate 98 along with the message is sent into counter 32. The result of this operation is that counter 32 reaches zero count only after the undesired data has been gated out of the decoder buffer 22. Thus, AND gate 102 inhibits passage of this data to the data sink 24 until all of the undesired data has been gated from the decoder buffer 22.

*OK/RQ generator*

The OK/RQ generator (FIG. 2) includes in FIG. 3 flip-flop 104, AND gates 106 and 108, flip-flop 110 and OR gate 112. The OK/RQ generator receives inputs from OR gate 114 and OR gate 116. OR gate 114 is responsive to state signals S2 and S4 to indicate that an RQ has been received by the terminal. OR gate 116 is responsive to state signals L1, L2, S1, S3, and S5 to indicate that the message block from the other terminal was properly received.

In operation, the OK/RQ generator basically consists of flip-flop 104 and AND gates 106 and 108. The RQ signal from OR gate 114 is passed to the reset side of flip-flop 104, while OK signals are passed to the set side of flip-flop 104. Accordingly, if an OK is indicated the flip-flop 104 will have an output indicating an OK, whereas, if an RQ has been received the flip-flop will be reset and have an output indicating that the OK/RQ bit for the encoder is to be an RQ signal.

The purpose of AND gates 106 and 108, flip-flop 110, and OR gate 112 is to insure that only the first state signal will generate the OK/RQ bit to be inserted in the encoded message block. For example, if the receiver was operating in the short block mode while the encoder was still operating in the long block mode it would be possible for two state signals to be generated prior to the complete encoding of the long message block being transmitted. As pointed out previously, one rule of operation for the system is that only the first state signal be used to encode the OK/RQ bit in the transmitted message block.

The AND gates, the flip-flop, and the OR gate work as follows. Flip-flop 110 is set by the encoder zero count received from encoder block length counter 118. When flip-flop 110 is thus set, AND gates 106 and 108 will pass the received OK or RQ signal. Note that the OK or RQ signal also act through OR gate 112 to reset flip-flop 110. Therefore, immediately after the AND gates 106 and 108 have passed the OK or RQ signal they become inhibit gates because the flip-flop 110 has been reset. Flip-flop 110 will not again be set until the next start of a transmitted message block. Therefore, in the meantime, if another OK or RQ signal is passed by OR gates 116 or 114 respectively, it will not get through AND gates 106 or 108 to act on flip-flop 104.

*M counter*

M counter 40 (FIG. 2) includes in FIG. 3 the M counter 120 and in addition the inverter 112 and AND gate 124. The M counter 120 is also responsive to the OK and RQ signals from OR gate 116 and 114 respectively. As a starting point assume that the counter is at zero count. The M+1 count signal being inverted and passed to AND gate 124. Thus, each OK signal received from gate 116 will pass through AND gate 124 and cause the counter to make a single count. If M consecutive OK signals are received, the M counter will generate an M count signal. If immediately thereafter another OK signal is received, the counter goes on to generate an M+1 count signal which acting through inverter 122 blocks passage of further OK signals through AND gate 124. If at any time in the counting, an RQ signal is received by M counter 120 from OR gate 114, then the counter is reset to zero and begins again to count OK signals.

*Long/short generator*

Long/short generator (FIG. 2) includes in FIG. 3 flip-flop 126 and AND gate 128. AND gate 128 is responsive to the encoder zero count and the M count signal from M counter 120 to generate an output pulse. The output pulse of AND gate 128 then sets flip-flop 126. When flip-flop 126 is set its output indicates that the transmitting portion of the terminal should be transmitting in the long message block mode. Flip-flop 126 is reset by an RQ indication from the OK/RQ generator. The RQ signal out of flip-flop 104 is inverted by inverter 130 and passed through AND gate 132 on the encoder zero count. The pulse out of the AND gate 132 then is passed to the reset terminal of flip-flop 126, thereby causing the flip-flop to assume a level indicative of the short message block mode.

*Go-back signal generator*

The go-back signal generator 48 (FIG. 2) includes in FIG. 3 the logic in the left hand portion of FIG. 3*c*. AND gates 134, 136 and 138 are the heart of the go-back signal generator. Each AND gate is responsive to one or more bias signals and a go-back pulse. The go-back pulse is generated by AND gate 132 in response to the encoder zero count pulse and the RQ signal from the OK/RQ generator (flip-flop 104). Only one of the AND gates 134, 136, or 138 will have an output pulse when it is struck by the go-back pulse. Which AND gate generates an output pulse indicates whether the retransmission requires a go-back two short blocks, two long blocks, or a long and a short block.

AND gate 134 is responsive to three inputs. A first input is biased by a signal from flip-flop 146 via inverter 144. This first bias signal is a no-blank signal, i.e., the terminal is not inserting a blank message block for transmission. When the terminal is inserting a blank message block, flip-flop 146 is set and generates a blank signal. Normally the blank signal is absent (no-blank), and inverter 144 outputs a bias permitting the AND gate 134 to function. However, if the blank signal is present, AND gate 134 is inhibited. The second input for AND gate 134 is biased by a signal from flip-flop 126 via delay line 140 and inverter 142. Delay line 140 delays the long/short signal from flip-flop 126 so that as applied to AND gate 134, the long/short signal does not change until after the go-back pulse. Delaying the long/short signal means that the long/short mode of operation during the previous block controls how much data must be retransmitted. Inverter 142 inverts the delayed long/short signal so that the AND gate 134 is properly biased only if the delayed signal is a "short" signal. The third input for AND gate 134 is the go-back pulse previously discussed.

If AND gate 134 is biased by a no-blank signal and a "short" signal when the go-back pulse arrives, the AND gate will generate an output pulse. This output is the go-back two short blocks pulse and is sent to scan control 50 (FIG. 2) hereinafter described in detail.

AND gate 136 generates the go-back two long blocks pulse and functions in a manner similar to AND gate 134. The only difference is that inverter 142 is not used so that the AND gate 136 responds directly to the delayed long/short signal. AND gate 136 is properly biased only by the "long" signal. Thus, its output pulse is the go-back two long blocks pulse.

AND gate 138 is responsive to the go-back pulse from AND gate 132 and also to flip-flop 146. Flip-flop 146 has an output when an RQ is generated by the OK/RQ generator during the first long message block after a previous short message block. Accordingly, AND gate 138, in response to flip-flop 146 and the go-back pulse, generates a pulse indicating go-back one long block and one short block. In order to set and reset flip-flop 146, logic circuitry is provided which consists of AND gate 148, flip-flop 150, AND gate 152 and inverter 154. The purpose of this logic circuitry is to set flip-flop 146 when an RQ occurs during the first long block after a series of previous short blocks.

In operation, the logic circuit receives at the inverter 154, the M count signal from M counter 120. This signal is inverted and passed to AND gate 152 which also receives an encoder zero count input. AND gate 152 has an output each time there is an encoder zero count pulse so long as there is no M count signal. This output is used to reset flip-flop 150. Flip-flop 150, on the other hand is set by AND gate 128 which generates an output pulse when there is an encoder zero count and an M count signal. The result is that flip-flop 150 has an output during the first long message block transmitted after previous transmission of short message blocks.

AND gate 148 receives the signal from flip-flop 150 and also receives the RQ signal from inverter 130. Both of these signals represent voltage levels. In addition AND gate 148 receives a pulse at the encoder RQ time. This pulse is generated by the encoder block length counter 118, therefore, flip-flop 146 is set at the RQ time of the encoder block length counter if an RQ is indicated by the OK/RQ generator during the first long block after previous short blocks. Flip-flop 146 is reset by an end-of-data time pulse from the encoder block length counter 118. Thus, flip-flop 146 will be set for the duration of one message block measured from the RQ time of one message block to the end-of-data time of the next message block.

The signal from the flip-flop 146, as previously pointed out, is used to generate the go-back one long block and one short block pulse. In addition, this signal (labeled blank) is passed on to scan control 50 and polarity generator 44 (FIG. 2). The detail operation of these two devices will now be discussed with reference to FIG. 3.

*Scan control*

Scan control 50 (FIG. 2) includes in FIG. 3, scan counter 156, registers 158, 160, and 162, flip-flop 164 and other associatetd gating logic. Each of the registers 158, 160, and 162 contain a fixed count which represents respectively the number of data bits in two short blocks ($2K_S$) two long blocks ($2K_L$) and a long block plus a short block ($K_L+K_S$). These counts will be gated to the scan counter 156 according to which of the associated AND gates, one for each register, is triggered by a go-back signal from AND gates 134, 136, or 138. The count from the gated register is added to the count in scan counter 156. The count in the scan counter 156 controls the position of the scanner 166 for read-out of stages of shift register 168. Data is passed from the shift register 168 through the scanner 166 to the encoder 117. Scanner 166 and shift register 168 represent the encoder buffer 12 (FIG. 2).

The logic circuits, AND gates 170 and 172, associated with the scan counter 156 pass the timing signals for gating data; the logic circuits will be operatively described now. AND gate 170 receives an input from flip-flop 164, master clock 56, and the inverted blank signal. Flip-flop 164 is set by the encoder zero count and reset by the end-of-data time. Accordingly, flip-flop 164 permits the AND gate 170 to pass clock signals from master clock 56 only during the data time portions of message blocks. With regard to the blank signal, normally this signal will be absent and the inverter 171 will provide a signal permitting the AND GATE 170 to function. However, in the presence of a blank signal the AND gate 170 will be blocked and clock pulses will not pass through it.

Clock pulses passed by AND gate 170 are used to count down the scan counter 156, or if the scan counter is at zero count they are used via AND gatt 176 to output data from data source 10. AND gate 172 acts to gate clock pulses into the scan counter 156 only when the scan counter is not at zero count. If on the other hand the scan counter is at zero count, inverter 174 inhibits AND gate 172.

Zero count is also used to gate clock pulses through AND gate 176 to data source 10 and shift register 168. This represents the situation where data is being directly transmitted and there is no retransmission. In this operation, data is passed from data source 10 into the shift register 168 and shifted down the length of the register by the clock pulses. The data is read out by scanner 166 to the encoder 117 as it enters the shift register at the zero stage and moves on through the shift register. When the data reaches the end of the shift register at the $2K_L+K_S$ stage it is merely spilled out.

In the event the scan control receives a go-back signal, the scan counter 156 is set to a count depending upon which of the registers 158, 160, and 162 is triggered by the go-back pulse. The count in the scan counter then causes the scanner 166 to read out the data bit in the register represented by that count. For example, a count of "I" in the scan counter causes the scanner 166 to read out the Ith stage of shift register 168. This Ith register contains the previously transmitted Ith bit. As the scan counter 156 is counted down by clock pulses, scanner 156 operates to read out previously transmitted data from the shift register 168. When the scan count reaches zero then new data from the data source is again transmitted and also temporarily stored in the shift register.

*Polarity generation*

The polarity generator 44 (FIG. 2) includes in FIG. 3 AND gate 178, binary trigger 180, AND gates 182 and 184 and OR gate 186.

In operation, binary trigger 180 generates an alternating sequence of binary bits with the bits triggered on the encoder zero count through AND gate 178. AND gate 178 is blocked from transmitting the encoder zero count in the event a blank signal is received from flip-flop 146 in the go-back signal generator. This effectively causes the binary trigger to skip a message block and thereby invert the sequence of polarity bits for succeeding message blocks.

The polarity bit is generated from the output of the binary trigger 180 normally by being passed through AND gate 182 and OR gate 186. However, in the event there is an M count signal from the M counter 120, AND gate 182 is shut down and AND gate 184 is permitted to pass the inverted representation of the pulse from the binary trigger 180. The effect is to invert one pulse in the polarity bit sequence when there is an M count signal from M counter 120.

*Encoder*

The encoder 14 (FIG. 2) includes in FIG. 3 encoder 117 and encoder block length counter 118 with associated gating circuitry. Encoder block length counter 118, responsive to clock pulses, generates the timing counts (encoder zero count, RQ time, end-of-data time) to control the make-up of message block in encoder 117 and also, as previously pointed out, to provide gating times for the generation of other control signals in the terminal.

The encoder block length counter 118 is set to the long message block count or to the short message block count according to the long/short signal which operates on AND gate 188 and AND gate 190 through inverter 192. If a "long" signal is received from the long/short generator, it is passed through AND gate 188 on the encoder zero count and sets the encoder block length counter 118 to the long message block mode. If a "short" signal is received from the long/short generator, this signal is inverted by inverter 192 and passed through AND gate 190 on the encoder zero count to set the encoder block length counter to the short message block mode.

Encoder 117 receives the data from scanner 166 and the timing counter from the encoder block length counter 118. According to the timing counts message blocks are made up in the short or long block mode. The OK/RQ bit and the polarity bit are received from their respective generators and inserted into the message block. The composite message block is then passed to transmitter 16 for modulation and transmission.

CONCLUDING REMARKS

The above description represents the preferred embodiment but not the only embodiment of the invention. Many embodiments varying immaterially from the preferred embodiment could be designed by one skilled in the art; however, all of these embodiments would still contain the gist of our invention. The following are a few of the many variations that could be made on the preferred embodiment.

In the preferred embodiment, the message block format is adapted by changing the length of message blocks transmitted. However, it would be just as easy to change the message block format by changing the duration of data bits, by changing the error-correcting or error-checking code used in the message blocks or by changing the information content in a data bit (a change to multilevel data bits). These are just a few examples of changes that could be made in the message block format in an Adaptive Dual RQ system without departing from the gist of our invention.

In the preferred embodiment, the mode synchronizing signal is a polarity bit. The mode synchronizing signal could be conveyed in many other ways. For example, the polarity of entire message blocks could be alternated in the same way that the preferred embodiment alternates the polarity bit. Also, the mode synchronizing signal might be conveyed by encoding the signal in a pattern of bits in a message block or by transmitting it as a separate signal. The mode synchronizing signal could be conveyed in many ways without departing from the gist of our invention.

The preferred embodiment also uses a go-back two blocks operation for the retransmission of data. If the transmission time exceeds the maximum limit $t'D$ (FIG. 7), for go-back two, it is necessary to use a go-back three (or more) blocks operation for the retransmission of data. If this is required, some additional states of operation are needed for the terminals and accordingly more logic circuitry is required. However, the basic concepts in the mode signal generator and the go-back scan control are unchanged. In addition, the polarity bit, (mode synchronizing signal) would have to be changed to be of the same numerical order as the number of go-back blocks in the retransmission operation. For example, in the preferred embodiment, the system uses a go-back two blocks operation and the polarity bit is a binary signal. If a go-back three blocks operation were used, the polarity bit would have to be changed to a tertiary signal. Note that if a tertiary signal were used, then it is possible to design an adaptive system that has three different message formats rather than the two message formats used in the preferred embodiment. The design of such a system would be more complex than the preferred embodiment but the basic concepts involving the use of the mode synchronizing signal and the OK/RQ signal would be the same. Thus, such a structure would still contain the gist of our invention.

This entire specification has been directed to a Dual RQ data transmission system because that is the most efficient RQ system. However, there are also Simple RQ and Idle RQ data transmission systems. In Idle RQ data transmission systems, a message block is sent from a first terminal to a second terminal, and the first terminal then waits for an OK/RQ signal from the second terminal before transmitting the next message block. If an RQ signal comes back, the first terminal retransmits the same message block. In Simple RQ, the message blocks are continuously sent from a first terminal to the second terminal, and the second terminal sends back OK/RQ signals. If an RQ signal comes back, the first terminal retransmits only the message block to which the RQ signal relates. It will be apparent to one skilled in the art that both of these systems could be made adaptive by using the mode synchronizing signal and the same concepts of adaptivity as taught in the preferred embodiment.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A communications terminal for an adaptive, dual, request-restransmit data transmission link comprising:

decoding means responsive to a message block received from the other terminal in the transmission link for decoding data, an OK/RQ signal and a polarity signal from the received message block and for indicating an error signal when the received message block contains an error;

expected polarity comparing means responsive to said decoding means for comparing the received polarity signal with an expected polarity signal and for generating a polarity compare signal indicating correct polarity if the received and expected polarity agree and false polarity if the received and expected polarity do not agree;

state signal generating means responsive to said decoding means and said expected polarity comparing means for generating a state signal from the OK/RQ signal, the polarity compare signal and the error signal, said state signal controlling the state of operation of the terminal during receipt of the next message block;

said decoding means responsive to said state signal generating means to change the length of message blocks being decoded from long to short, when the state signal indicates receipt of an error or RQ signal, and to change the length of message blocks being decoded from short to long, when the state signal indicates receipt of an OK with correct polarity in the preceding short message block and an OK with false polarity in the present short message block;

decode buffering means responsive to said decoding means for buffering decoded data until it is replaced or read out, said decode buffering means responsive to said state signal generating means to read-out data when the state signal indicates the data is from an error-free message block;

OK/RQ signal generating means responsive to said state signal generating means for generating an RQ signal when the state signal indicates receipt of an error or an RQ, and an OK signal when the state signal indicates receipt of a correct message block or that the message block is being ignored;

counting means responsive to said state signal generating means for counting successive state signals indicating receipt of successive, correct short length message blocks, said counting means generating a count signal when a given number of successive, correct short length message blocks have been counted;

long/short generating means responsive to said OK/RQ signal generating means and said counting means for generating a "long" signal upon receipt of a count signal from said counting means and for generating a "short" signal upon receipt of RQ from said OK/RQ signal generating means;

go-back signal generating means responsive to said OK/RQ signal generating means and said long/short generating means for generating a go-back 2 short blocks signal when a "short" signal and an RQ signal are received respectively from said long/short signal generating means and said OK/RQ signal generating means, for generating a go-back 2 long blocks signal when a "long" signal and an RQ signal are received respectively from said long/short signal generating means and said OK/RQ signal generating means, for generating a go-back 1 short block and 1 long block signal and a dummy signal when an RQ signal is received just after the long/short signal has changed from a "short" signal to a "long" signal;

a polarity generating means responsive to said counting means and said go-back signal generating means for generating a polarity signal alternating for each successive message block to be transmitted from the terminal, said polarity generating means inverting the normal polarity signal for one message block when a count signal is received from said counting means and said polarity generating means delaying the polarity signals one message block when a dummy signal is received from said go-back signal generating means;

scan control means responsive to said go-back signal generating means for controlling according to the go-back signals the amount of previously transmitted data to be read out for retransmission;

encode buffering means responsive to a data source and said scan control means for buffering data, for storing recently transmitted data and for reading out new data or previously transmitted data depending upon the control supplied by said scan control means;

and encoding means responsive to said long/short signal generating means for encoding for transmission long or short message blocks according to the long/short signal, said encoding means responsive to said encode buffering means for encoding data into the transmitted message block, said encoding means responsive to said OK/RQ signal generating means for encoding the OK/RQ signal into the transmitted message block, and said encoding means responsive to said polarity signal generating means for encoding the polarity signal into the transmitted message block.

2. A communications terminal for an adaptive dual request-retransmit data transmission link comprising the communications terminal of claim 1 and in addition:

a read-out inhibit counting means responsive to said state signal generating means for counting data from a long message block gated out of said decode buffering means when the state signal indicates receipt of an OK with false polarity in the first short message block after a long message block;

a read-out inhibit gating means responsive to said read-out inhibit counting means to block read-out of data while said read-out inhibit counting means is counting so that the same data received twice by the terminal is only read out once.

3. A communications terminal for an adaptive, dual request-retransmit data transmission system for transmitting and receiving message blocks having a first format, when conditions on the transmission link are favorable, and having a second format, when conditions on the transmission link are adverse, comprising:

decoding means responsive to a message block received from another terminal for decoding data, an OK/RQ signal and a mode synchronizing signal from the received message block, said decoding means also generating an error signal when the received message block is in error;

monitoring means responsive to said decoding means for monitoring the OK/RQ, mode synchronizing and error signals from said decoding means;

said decoding means responsive to said monitoring means to adapt the decoding operation to the first format of received message blocks when said monitoring means indicates receipt of a mode synchronizing signal, said decoding means responsive to said monitoring means to adapt the decoding operation to the second format of received message blocks when said monitoring means indicates receipt of an error signal or an RQ signal;

decode buffering means responsive to said decoding means for buffering decoded data and said decode buffering means responsive to said monitoring means to gate out data when said monitoring means indicates the data to be gated out is from a correctly received message block containing an OK signal;

encode buffering means responsive to a data signal for buffering recently transmitted data;

encoding means responsive to said encode buffering means for encoding data into message blocks for transmission;

mode signal generating means responsive to said monitoring means for adapting said encoding means to start encoding message blocks in the first format when said monitoring means has received a number of OK signals, for adapting said encoding means to start encoding message blocks in the second format when said monitoring means has received an error signal or an RQ signal, said mode signal generating means generating a mode synchronizing signal indicating when the message format for said encoding means is being changed, said mode signal generating means also generating an OK signal when said monitoring means has received an OK signal or ignored the received message block, said mode signal generating means also generating an RQ signal when said monitoring means has received an error signal or an RQ signal, said mode signal generating means also generating a message format signal indicating the message format being transmitted;

go-back scan control means responsive to the message format signal and the RQ signal generated by said mode signal generating means for controlling how much recently transmitted data must be read out of said encode buffering means for retransmission;

said encoding means also responsive to said mode signal generating means to encode in the message block being transmitted the OK/RQ and the mode synchronizing signals generated by said mode signal generating means so that the other terminal in the transmission link may detect when the subject terminal is changing message formats and requesting retransmission of data.

4. A communications terminal for an adaptive, dual request-retransmit data transmission link comprising:

decoding means responsive to a message block received from another terminal for decoding data, an OK/RQ signal and a mode synchronizing signal from the received message block, said decoding means also generating an error signal when the received message block is in error;

monitoring means responsive to said decoding means for generating a state signal to control the mode of operation of the terminal according to the OK/RQ mode synchronizing and error signals from said decoding means;

said decoding means responsive to said monitoring means to adapt the decoding operation to the format of received message blocks when the state signal indicates that the format of received message blocks is being changed;

decode buffering means responsive to said decoding means for buffering decoded data and said decode buffering means responsive to said monitoring means to gate out only the data indicated by the state signal as being error-free;

encode buffering means responsive to a data signal for buffering recently transmitted data;

encoding means responsive to said encode buffering means for encoding data into message blocks for transmission;

mode signal generating means responsive to said monitoring means for adapting said encoding means to encode different message formats according to the conditions on the transmission link as indicated by the state signals from said monitoring means, said mode signal generating means also generating an OK/RQ signal according to whether or not a message block was properly received as indicated by the state signals and a mode synchronizing signal indicating when the message format for said encoding means is being changed, said mode signal generating means also generating signal indicating the message format being transmitted at the time when the state signals indicate a retransmission is necessary;

go-back scan control means responsive to said mode signal generating means for controlling, according to the signal indicating the message format being transmitted at a time a retransmission becomes necessary, how much recently transmitted data must be read out of said encode buffering means for retransmission;

said encoding means also being responsive to said mode signal generating means to encode in the message block being transmitted the OK/RQ signal and the mode synchronizing signal so that the other terminal in the transmission link may detect when the subject terminal is changing message formats and requesting retransmission of data.

5. A communications terminal for an adaptive, dual request-retransmit data transmission link comprising the communications terminal of claim 4 and in addition:

a read-out inhibit counting means responsive to said monitoring means for counting while data is gated out of said decode buffering means when the state signal indicates data correctly read out before is being gated out of said decode buffering means again;

a read-out inhibit gating means responsive to said read-out inhibit counting means to block read-out of data while said read-out inhibit counting means is counting so that the same data received twice by the terminal is only read out once.

6. A communications terminal in an adaptive dual request-retransmit data transmission system comprising:

a transmitting means for buffering recently transmitted data, for encoding data into message blocks for transmission and for transmitting the message blocks, said message blocks having more than one format with each format differing in its resistance to adverse conditions on the transmission link, each of said message blocks having an OK/RQ signal and a mode synchronizing signal;

a receiving means for receiving message blocks, for decoding and detecting data, errors, OK/RQ signals and mode synchronizing signals from the received message blocks, for buffering received data and for reading out error-free data;

a monitoring means responsive to said receiving means for monitoring the errors, OK/RQ signals and mode synchronizing signals;

said receiving means being responsive to said monitoring means to adapt the decoding operation to a format more resistant to adverse conditions when said monitoring means indicates an error or an RQ signal has been received, said receiving means also being responsive to said monitoring means to adapt the decoding operation to a format less resistant to adverse conditions on the transmission link when said monitoring means indicates a number of correct message blocks have been received;

a mode signal generating means responsive to said monitoring means for adapting the encoding operation of said transmitting means to a format more resistant to adverse conditions when said monitoring means indicates receipt of an error or an RQ signal, said mode signal generating means responsive to said monitoring means for changing the encoding operation of said transmitting means to a format less resistant to adverse conditions when said monitoring means indicates receipt of a number of correct message blocks, said mode signal generating means generating a mode synchronizing signal to indicate when said transmitting means is changing to a message format less resistant to adverse conditions, said mode signal generating means generating an OK/RQ signal to indicate whether or not a message block was received without error; said mode signal generating means also generating a message format signal indicating the message format being transmitted;

go-back scan control means responsive to the message format signal and OK/RQ signal generated by said mode signal generating means for controlling how much data must be retransmitted when said monitoring means indicates to said mode signal generating means that a retransmission is required;

said transmitting means responsive to said mode signal generating means for encoding into the message block being transmitted the OK/RQ signal and the mode synchronizing signal generated by said mode signal generating means so that the other terminal in the transmission link may detect when the subject terminal is changing message formats and requesting retransmission of data.

7. A communications terminal in an adaptive dual request-retransmit data transmission system comprising:

a transmitting means for buffering recently transmitted data, for encoding data into message blocks for transmission and for transmitting the message blocks, said message blocks having more than one format with each format differing in resistance to adverse conditions on the transmission link, each of said message blocks having an OK/RQ signal and a mode synchronizing signal;

a receiving means for receiving message blocks for decoding and detecting data, errors, OK/RQ signals and mode synchronizing signals from the received message blocks, for buffering received data and for reading out error-free data;

an adaptive control means responsive to said receiving means for adapting the decoding operation in said receiving means and the encoding operation in said transmitting means to a first message format more resistant to adverse conditions when said receiving means detects an error or an RQ signal in the received message block, said adaptive control means signaling to the other terminal in the transmission link the adaptation of transmitted message blocks to the first message format by inserting an RQ signal in the transmitted message block, said adaptive control means responsive to said receiving means for adapting the decoding operation in said receiving means to a second message format less resistant to adverse conditions when said receiving means detects a mode synchronizing signal indicating the message format of received message blocks is being changed to the second message format, said adaptive control means responsive to said receiving means for adapting the encoding operation in said transmitting means to the second message format when said receiving means detects a plurality of error-free received message blocks, and for signaling to the other terminal in the transmission link the adaptation of the transmitted message block to the second message format by inserting in the transmitted message block a mode synchronizing signal indicating the message format is being changed to the second message format.

8. A communications terminal in an adaptive, dual request-retransmit data transmission system comprising the apparatus of claim 7 and in addition go-back scan control means responsive to said receiving means for controlling how much data must be retransmitted when said receiving means detects an RQ signal or an error.

9. A communications terminal in an adaptive, dual request-retransmit data transmission system comprising the apparatus of claim 8 and in addition read-out inhibiting means responsive to said receiving means to block a second read-out of the same data received a second time when said receiving means detects a mode synchronizing signal indicating the data was properly received the first time.

10. An adaptive, dual request-retransmit data transmission system comprising:

a first communications terminal including the apparatus of claim 7 for adapting the encoding and decoding of message blocks into different message formats in response to the conditions on the transmission link and to OK/RQ signals and mode synchronizing signals from a second communications terminal, said first communications terminal conveying to the second communications terminal the adaptation of transmitted message blocks to different message formats by inserting the OK/RQ signal and mode synchronizing signal in the transmitted message blocks;

a second communications terminal including the apparatus of claim 7 for adapting the encoding and decoding of message blocks into different message formats in response to conditions on the transmission link and to OK/RQ signals and mode synchronizing signals from said first communications terminal, said second communications terminal conveying to said first terminal the adaptation of transmitted message blocks to different message formats by inserting the OK/RQ signal and the mode synchronizing signal in the transmitted message blocks so that both of said terminals in the transmission link may be synchronized as to message format of transmitted message blocks.

11. A communications terminal in a request-retransmit data transmission system comprising:

a transmitting means for buffering recently transmitted data, for encoding data into message blocks for transmission and for transmitting the message blocks, said message blocks having more than one format with each format differing in resistance to adverse conditions on the transmission link, each of said message blocks having an OK/RQ signal and a mode synchronizing signal;

a receiving means for receiving and detecting OK/RQ signals and mode synchronizing signals from the other terminal in the transmission link;

an adaptive control means responsive to said receiving means for adapting the encoding operation in said transmitting means to a first message format more resistant to adverse conditions when said receiving means detects an RQ signal, said adaptive control means conveying the change to the first message format to the other terminal in the transmission link by inserting a request-retransmit signal in the transmitted message block, said adaptive control means responsive to said receiving means for adapting the encoding operation in said receiving means to the second message format, when said receiving means detects a plurality of received confirmation signals, and for conveying the change to the second message format to the other terminal in the transmission link by inserting in the transmitted message block a mode synchronizing signal indicating the message format is being changed to the second message format.

12. A communications terminal in an adaptive, dual request-retransmit data transmission system comprising:

a transmitting means including means for buffering recently transmitted data, means for encoding data into message blocks for transmission and means for transmitting the message blocks, said message blocks having more than one format with each format differing in resistance to adverse conditions on the transmission link, each of said message blocks having an OK/RQ signal and a mode synchronizing signal;

a receiving means including means for receiving message blocks, means for decoding and detecting data, errors, OK/RQ signals and mode synchronizing signals from the received message blocks, means for buffering received data and means for reading out error-free data;

an adaptive control means including means responsive to said receiving means for adapting the decoding operation in said receiving means and the encoding operation in said transmitting means to a first message format more resistant to adverse conditions when said receiving means detects an error or an RQ signal in the received message block, means for signaling to the other terminal in the transmission link the adaptation of transmitted message blocks to the first message format by inserting an RQ signal in the transmitted message block, means responsive to said receiving means for adapting the decoding operation in said receiving means to a second message format less resistant to adverse conditions when said receiving means detects a mode synchronizing signal indicating the message format of received message blocks is being changed to the second message format, means responsive to said receiving means for adapting the encoding operation in said transmitting means to the second message format when said receiving means detects a plurality of error-free received message blocks and means for signaling to the other terminal in the transmission link the adaptation of the transmitted message block to the second message format by inserting in the transmitted message block a mode synchronizing signal indicating the message format is being changed to the second message format.

References Cited

UNITED STATES PATENTS

| | | | |
|---|---|---|---|
| 3,235,661 | 2/1966 | Oxley et al. | 340—172.5 |
| 3,261,001 | 7/1966 | Magnin | 178—50 |

PAUL J. HENON, *Primary Examiner.*

G. D. SHAW, *Assistant Examiner.*